(12) United States Patent
Lee

(10) Patent No.: US 9,778,835 B2
(45) Date of Patent: Oct. 3, 2017

(54) METHOD FOR DISPLAYING OBJECTS ON A SCREEN DISPLAY AND IMAGE DISPLAY DEVICE USING SAME

(75) Inventor: Dongjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 589 days.

(21) Appl. No.: 13/989,989

(22) PCT Filed: Sep. 23, 2011

(86) PCT No.: PCT/KR2011/007037
§ 371 (c)(1),
(2), (4) Date: May 28, 2013

(87) PCT Pub. No.: WO2012/074189
PCT Pub. Date: Jun. 7, 2012

(65) Prior Publication Data
US 2013/0254694 A1 Sep. 26, 2013

(30) Foreign Application Priority Data
Nov. 29, 2010 (KR) .................. 10-2010-0119665

(51) Int. Cl.
*G06F 3/0484* (2013.01)
*G06F 3/0486* (2013.01)
*H04N 21/478* (2011.01)
*H04N 21/4782* (2011.01)
*H04N 21/482* (2011.01)
*G06F 3/0346* (2013.01)

(52) U.S. Cl.
CPC .......... *G06F 3/0486* (2013.01); *G06F 3/0346* (2013.01); *H04N 21/4781* (2013.01); *H04N 21/4782* (2013.01); *H04N 21/47815* (2013.01); *H04N 21/482* (2013.01); *G06F 2203/04803* (2013.01)

(58) Field of Classification Search
CPC . H04N 21/4316; G06F 3/0486; G06F 3/0488; G06F 17/2264; G06F 3/0481; G06F 3/04817
See application file for complete search history.

(56) References Cited

U.S. PATENT DOCUMENTS 5,819,055 A * 10/1998 MacLean .............. G06F 3/0481
715/798
5,883,626 A * 3/1999 Glaser ................. G06F 17/2264
715/781

(Continued)

FOREIGN PATENT DOCUMENTS

| KR | 10-2006-0016527 A | 2/2006 |
| KR | 10-2009-0059433 A | 6/2009 |
| KR | 10-2010-0069435 A | 6/2010 |

*Primary Examiner* — Namitha Pillai
(74) *Attorney, Agent, or Firm* — Birch, Stewart, Kolasch & Birch, LLP

(57) ABSTRACT

Provided are a method of controlling a screen display and an image display device using the same. The method includes: displaying a first object and a second object on a screen; as the first object displayed in a first area is dragged toward the second object, displaying a second area including the second object as a drop position of the first object; and as the first object is dropped in the second area, moving the first object to the second area and displaying the moved first object.

14 Claims, 26 Drawing Sheets

(56) References Cited

U.S. PATENT DOCUMENTS

| | | | |
|---|---|---|---|
| 7,325,199 B1* | 1/2008 | Reid | G06F 17/30056 |
| | | | 707/E17.009 |
| 2009/0146949 A1 | 6/2009 | Na | |
| 2010/0145936 A1* | 6/2010 | Grinstein | G06F 3/0486 |
| | | | 707/724 |
| 2011/0028194 A1* | 2/2011 | Tang | G06F 3/03543 |
| | | | 463/1 |
| 2011/0075031 A1* | 3/2011 | Jung | H04N 5/45 |
| | | | 348/565 |
| 2011/0161852 A1* | 6/2011 | Vainio | G06F 3/0488 |
| | | | 715/769 |
| 2012/0131483 A1* | 5/2012 | Archer | G06F 17/30899 |
| | | | 715/766 |

* cited by examiner

METHOD FOR DISPLAYING OBJECTS ON A SCREEN DISPLAY AND IMAGE DISPLAY DEVICE USING SAME

CROSS-REFERENCE TO RELATED APPLICATIONS

The present application claims priority under 35 U.S.C. 119 and 35 U.S.C. 365 to Korean Patent Application No. 10-2010-0119665 (filed on Nov. 29, 2010), which is hereby incorporated by reference in its entirety.

BACKGROUND

The present disclosure relates to a method controlling an operation of an image display device, and more particularly, to a method of controlling a screen displayed by an image display device.

Recently, digital TV service using a wired or wireless communication network is becoming more common. The digital TV service provides various services that existing analog broadcasting service cannot provide.

For example, in the case of internet protocol television (IPTV) service, i.e., one type of the digital TV service, interactivity is provided to allow a user to actively select the type and viewing time of a viewing program. The IPTV service may provide various enhanced service, for example, internet search, home shopping, and online game, on the basis of such interactivity.

SUMMARY

Embodiments provide a screen display controlling method that improves ease-of-use, and an image display device using the same.

In one embodiment, provided is a method of controlling a screen display of an image display device. The method includes: displaying a first object and a second object on a screen; as the first object displayed in a first area is dragged toward the second object, displaying a second area including the second object as a drop position of the first object; and as the first object is dropped in the second area, moving the first object to the second area and displaying the moved first object.

In another embodiment, an image display device includes: a display displaying on a screen a first object including a plurality of application items in addition to a second object; a user interface receiving a drag and drop operation on the first object displayed in a first area; and a control unit, when the first object is dragged and dropped in a second area including the second object, moving a display position of the first object to the second area and displaying at least a portion of the second object in the first area.

Meanwhile, the method of controlling a screen display of an image display device is executed on a computer readable recording medium having a program recorded thereon.

DETAILED DESCRIPTION OF THE EMBODIMENTS

Hereinafter, a screen display controlling method and an image display device using the same are described in more detail with reference to the accompanying drawings.

An image display device according to an embodiment of the present invention, as an artificial image display device adding a computer supporting function to a broadcast receiving function, may add an internet function while faithfully performing a broadcast receiving function, so that it may have an ease-of-use interface such as a writing type input device, a touch screen, and a spatial remote controller. Also, with the support of a wired or wireless internet function, the image display device may perform e-mail, web browsing, banking, or game functions in access to an internet or a computer. For such various functions, a standardized general OS may be used.

Therefore, in relation to an image display device according to an embodiment of the present invention, for example, since various applications are freely added on or deleted from a general OS kernel, user-friendly various functions may be performed. The image display device may be a network TV, an HBBTV, or a smart TV, and may be applied to a smart phone if necessary.

Furthermore, embodiments of the present invention will be described with reference to the accompanying drawings and the contents descried in the accompanying drawings, but the present invention is not limited thereto.

Terms used in the specification may select currently widely used general terms, if possible, in consideration of functions of the present invention, but may vary depending on the intentions or customs of those skilled in the art, or the advent of new technology. Also, in certain cases, an applicant may arbitrary select terms, and in this case, their meanings will be described in the specification. Therefore, terms used in this specification should be interpreted on the basis of the practical implications that the terms have and the entire contents herein, rather than the simple names of the terms.

Figure 1:
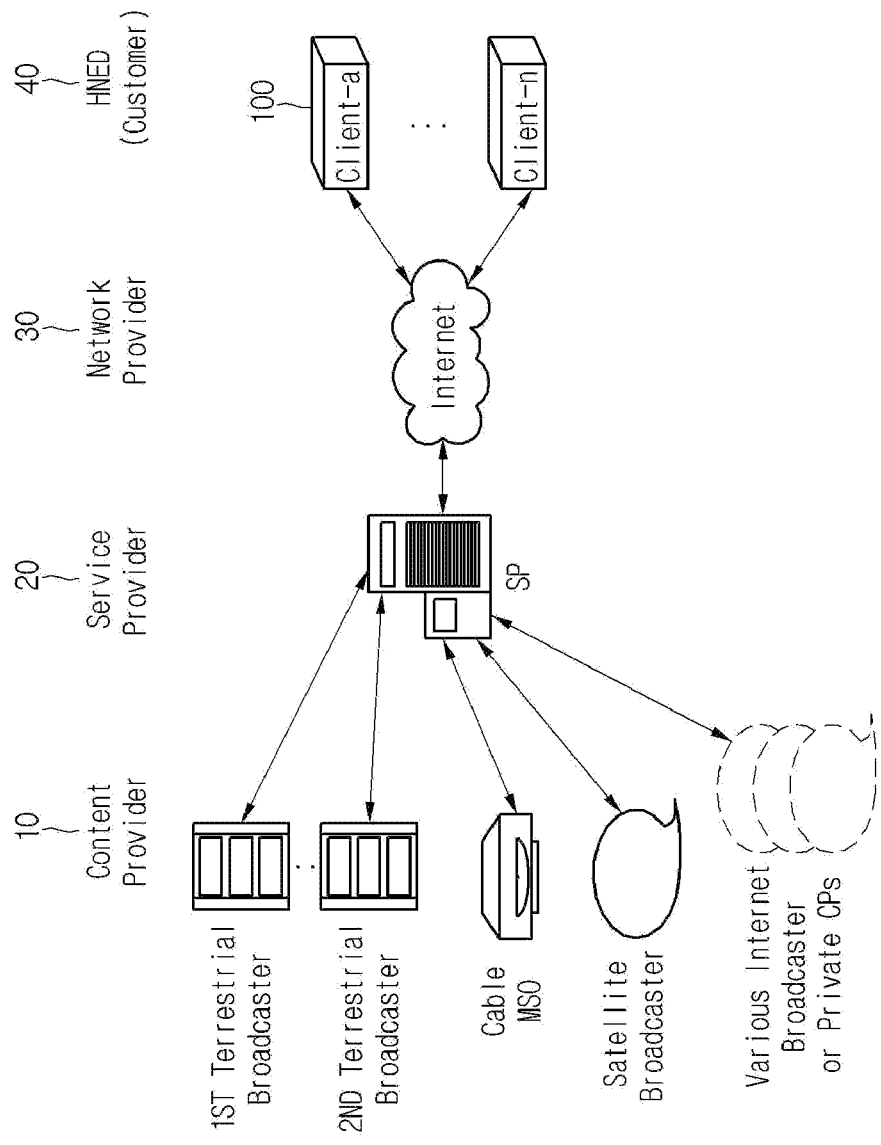
FIG. 1 is a view illustrating a configuration of a broadcast system according to an embodiment of the present invention.

FIG. 1 is a view illustrating a configuration of a broadcasting system. That is, FIG. 1 illustrating one example of an entire broadcasting system including an image display device according to an embodiment of the present invention.

Referring to FIG. 1, the broadcasting system includes a content provider (CP) 10, a service provider (SP) 20, a network provider (NP) 30, and an HNED 40.

The HNED 40 may correspond to a client 100, i.e., the image display device, and for example, the client 100 may be a network TV, a smart TV, or an IPTV.

Moreover, the CP 10 may produce and provide various contents, and as shown in FIG. 1, may be a terrestrial broadcaster, a cable System Operator (SO), a Multiple System Operator (MSO), a satellite broadcaster, or an Internet broadcaster.

Or, the CP 10 may provide various applications besides broadcast contents. This will be described below in more detail.

The SP 20 may service-packetize contents that the CP 10 provides and then may provide them. For example, the SP 20 may packetize a first terrestrial broadcast, a second terrestrial broadcast, a cable MSO, a satellite broadcast, various internet broadcasts, and applications, and then, may provide them to a user.

Moreover, the SP 20 may provide service to the client 100 through a unicast or multicast method.

The unicast method 1: 1 transmits data between one transmitter and one receiver. For example, in the case of the unicast method, when a receiver requests data to a server, the server transmits the data to the receiver in response to the request.

The multicast method transmits data to a plurality of receivers in a specific group, and for example, a server may simultaneously transmit data to a plurality of preregistered receivers. In order for such multicast registration, an Internet Group Management Protocol (IGMP) protocol may be used.

The NP 30 may provide a network for providing the above service to the client 100, and the client 100 may establish a home network end user (HNED) and then, may receive service.

As a means for protecting contents transmitted from the above system, conditional access or content protection may be used. As one example of the conditional access or content protection, CableCARD or Downloadable Conditional Access System (DCAS) may be used.

Moreover, the client 100 may provide content via a network, and in this case, the client 100 becomes a CP, and the CP 10 may receive content from the client 100. Accordingly, interactive content service or data service may be possible.

According to an embodiment of the present invention, the CP 10 may provide network service such as a Social Network Site (SNS), a blog, a micro blog, or an instant messenger.

For example, the CP 10 providing the SNS service may include a server (not shown) storing various kinds of contents such as texts that users write in the SNS or uploaded images.

In more detail, a user may access a server of the CP 10 providing the SNS service via an image display device and may designate accounts that the user wants, so that the user may confirm messages written by the designated accounts.

Additionally, when a user requests the SNS service, the image display device, i.e., the client 100, accesses the server of the CP 10 to receive the messages of the designated accounts, and then, may sequentially arrange and display the received messages in the order in which they are written, for example, from the top to the bottom.

Figure 2:
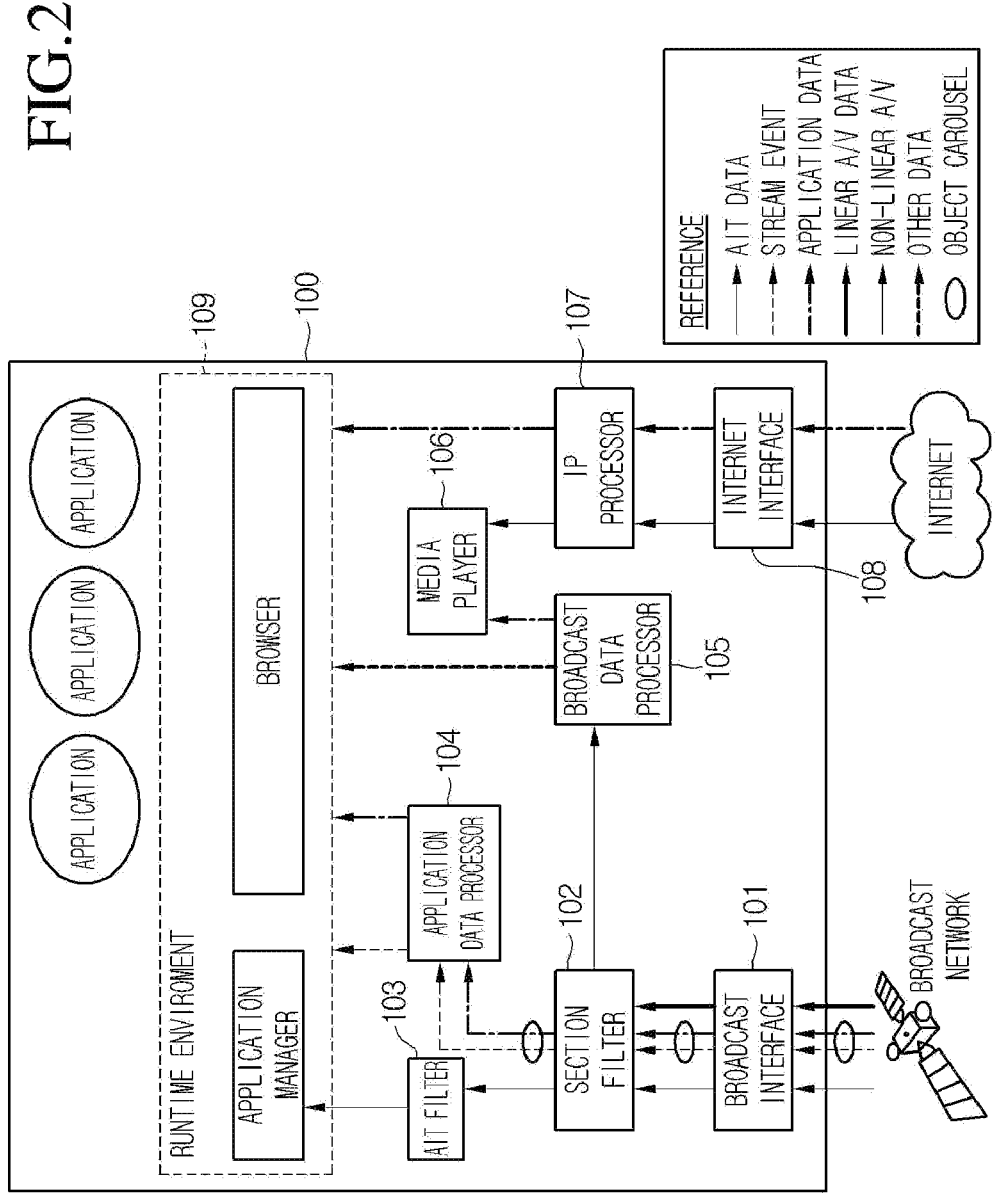
FIG. 2 is a view illustrating a configuration of a broadcast system according to another embodiment of the present invention.

Referring to FIG. 2, an image display device 100 corresponding to the client 10 of FIG. 2 may be connected to a broadcast network and an internet network.

For example, the image display device 100 may include a broadcast interface 101, a section filter 102, an AIT filter 103, an application data processor 104, a broadcast data processor 105, a media player 106, an IP processor 107, an internet interface 108, and a runtime module 109.

Moreover, the broadcast interface 101 of the image display device 100 may receive application information table (AIT) data, real-time broadcast content, application data, or stream events, and the real-time broadcast content may be linear A/V content.

The section filter 102 performs section filtering on four data received through the broadcast interface 101 to transmit AIT data to the AIT filter 103, transmit linear A/V content to the broadcast data processor 105, and transmit stream events and application data to the application data processor 104.

The internet interface 108 may receive non-linear A/V content and application data, and for example, the non-linear A/V content may be content on demand (COD) application.

In addition, the non-linear A/V content may be transmitted to the media player 106, and the application data may be transmitted to the runtime module 109.

Additionally, the runtime module 109 may include an application manager and a browser. The application manager may control a lifecycle on interactive application by using AIT data, and the browser may perform a function for displaying and processing the interactive application.

Figure 3:
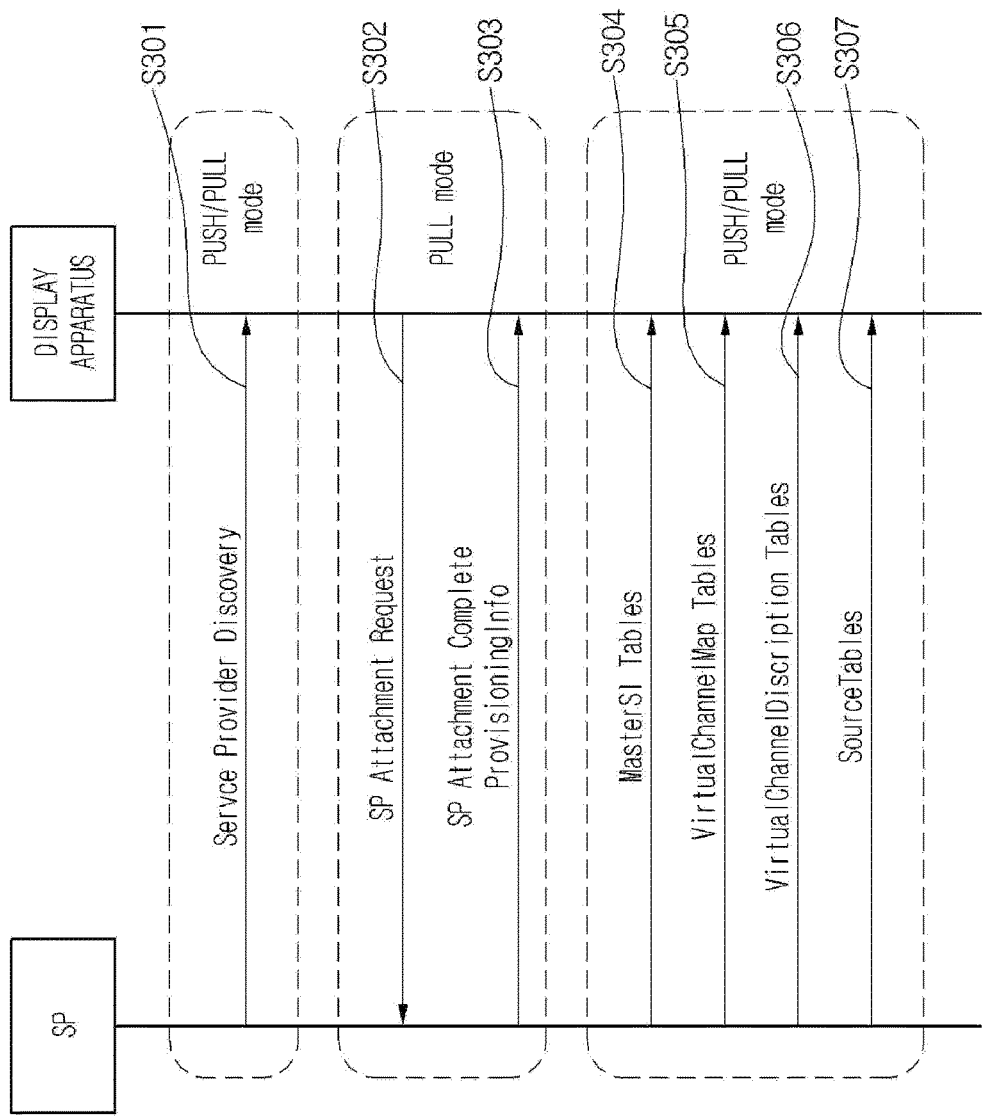
FIG. 3 is a view illustrating a method of transmitting/receiving data between an image display device and an SP according to an embodiment of the present invention.

FIG. 3 is a view illustrating a method of transmitting/receiving data between an image display device and an SP according to an embodiment of the present invention.

Referring to FIG. 3, the SP performs a service provider discovery operation in operation S301. The image display device transmits a service provider attachment request signal in operation S302. When the SP attachment is completed, the image display device receives provisioning information in operation S303. Furthermore, the image display device receives a master SI table from the SP in operation 5304, receives a virtual channel map table in operation S305, receives a virtual channel description table in operation S306, and a source table in operation S307.

For example, the service provider discovery may mean a procedure that SPs providing IPTV related service discovers a server that provides information on their services.

A method of finding an address list for receiving information on a service discovery (SD) server (for example, SP discovery information) may include the following three methods. First, an address preset in the image display device or an address manually set by a user may be used. Second a DHCP based SP discovery method may be used. Third, a DNS SRV-based SP discovery method may be used.

Moreover, the image display device accesses the server of an address obtained through one of the above three methods to receive a service provider discovery record containing information necessary for service discovery of each SP, and perform a service discovery operation by using the service provider discovery record. Moreover, the above operations are possible in a push mode and a pull mode.

Furthermore, the image display device accesses an SP attachment server designated as an SP attachment locator of the SP discovery record to perform a registration procedure (or a service attachment procedure).

Also, the image display device accesses an authentication service of the SP designated as the SP authentication locator to perform an additional authentication procedure, and then, performs a service authentication procedure.

After the service attachment procedure is successfully completed, data transmitted to the image display device may have the format of a provisioning information table.

During the service attachment procedure, the image display device includes its ID and position information in the data to be transmitted to a server, and provides the information to the server, and the service attachment server may specify a service that the image display device joins on the basis of the information.

The address information used for obtaining service information that the image display device is to receive may be provided in the format of a provisioning information table. Moreover, the address information may correspond to access information of a master SI table, and in this case, providing customized service for each subscriber may be easy.

Then, the service information may include a master SI table record managing the access information and version of a virtual channel map, a virtual channel map table providing a service list of a package type, a virtual channel description table including detailed information of each channel, and a source table including access information for accessing actual service.

Figure 4:
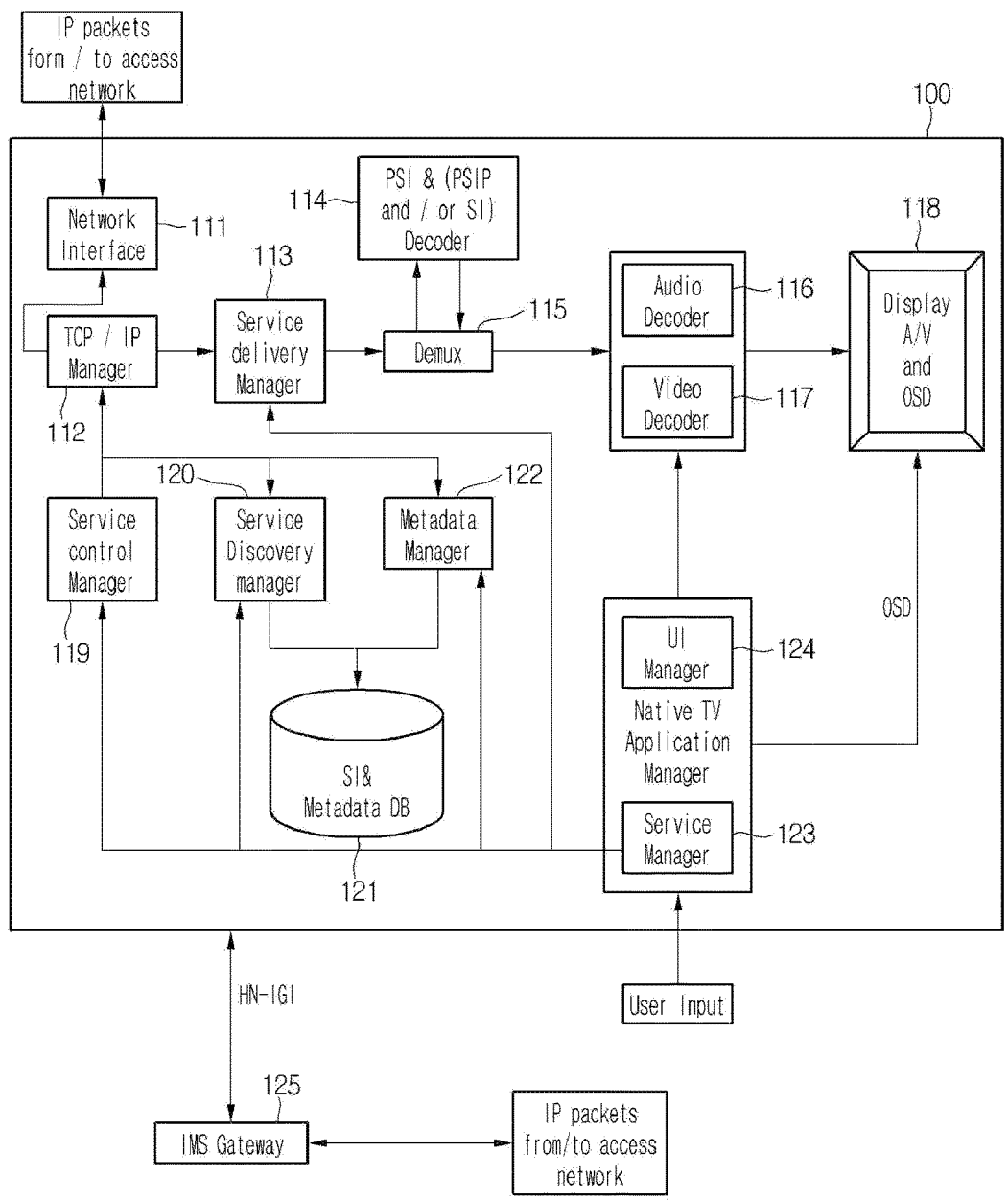
FIG. 4 is a block diagram illustrating a configuration of an image display device according to an embodiment of the present invention.

FIG. 4 is a block diagram illustrating a configuration of an image display device according to an embodiment of the present invention.

Referring to FIG. 4, the image display device 100 may include a Network Interface 111, a TCP/IP Manager 112, a Service Delivery Manager 113, a Demux 115, PSI&(PSIP and/or SI) decoder 114, an Audio Decoder 116, Video Decoder 117, a Display A/V and OSD Module 118, a Service Control Manager 119, a Service Discovery Manager 120, a Metadata Manager 122, an SI&Metadata DB 121, a UI manager 124, and a service manager 123.

The network interface 111 receives packets from a network, and transmits packets to a network. That is, the network interface 111 may receive service and content from a SP via a network.

The TCP/IP manager 112 may participate in transmitting packets from a source to a destination, i.e., packets received by the image display device 100 and packets that the image display device 100 transmits. Additionally, the TCP/IP manager 112 classifies received packets to correspond to an appropriate protocol, and outputs the classified packets to the service delivery manager 113, the service discovery manager 120, the service control manager 119, and the metadata manager 122.

Moreover, the service delivery manager 113 is responsible for controlling received service data, and for example, while controlling real-time streaming data, the service delivery manager 113 may use RTP/RTCP.

When the real-time streaming data are transmitted using a RTP, the service delivery manager 113 parses the received data packets according to the RTP to transmit them to the demux 115, or store them in the SI&Metadata DB 121 according to a control of the service manager 123. Additionally, the service delivery manager 113 feeds back the network reception information to a server providing service by using a RTCP.

The demux 115 demultiplexes the received packets into audio, video, and Program Specific Information (PSI) data, and then, transmits them to the audio/video decoders 116 and 117 and the PSI&(PSIP and/or SI) Decoder 114, respectively.

The PSI&(PSIP and/or SI) Decoder 114 may decode service information such as PSI. For example, the PSI&(PSIP and/or SI) Decoder 114 may receive and decode the PSI session, Program and Service Information Protocol (PSIP) session, or Service Information (SI) session, which are demultiplexed by the demux 115.

Additionally, the PSI&(PSIP and/or SI) Decoder 114 decodes the received sessions and creates a database on service information, and also stores the database on the service information in the SI&Metadata DB 121.

The Audio/Video Decoders 116 and 117 may decode the video and audio data received from the demux 115, and then, the decoded audio and video data are provided to a user through the display unit 118.

Moreover, the UI manager 124 and the service manager 123 manage an overall state of the image display device 100, provide a user interface, and manage another manager.

For example, the UI manager 124 provides a graphic user interface (GUI) to a user through on screen display (OSD), and performs an operation of a receiver according to an input after receiving a key input from a user. Moreover, when receiving a key input signal relating to a channel selection from a user, the UI manager 124 transmits the key input signal to the service manager 123.

The service manager 123 controls a service related manager such as the service delivery manager 113, the service discovery manager 120, the service control manager 119, and the metadata manager 122.

Additionally, the service manager 123 creates a channel map and selects a channel by using the channel map according to a key input received from the UI manager 124.

Also, the service manager 123 receives service information on a channel from the PSI&(PSIP and/or SI) Decoder 114, and sets the audio/video packet identifier (PID) of the selected channel in the demux 115.

The service discovery manager 120 provides information necessary for selecting a SP that provides service. For example, when receiving a signal on channel selection from the service manager 123, the service discovery manager 120 discovers a service by using the received signal.

In addition, the service control manager 119 is responsible for selecting and controlling service. For example, when a user selects an existing broadcasting method such as live broadcasting service, the service control manager 119 uses the IGMP or RTSP. When a user selects video on demand (VOD) service, the service control manager 119 selects and controls service by using the RTSP.

The RTSP may provide a trick mode for real-time streaming, and the service control manager 119 may initialize and manage a session passing through an IMC gateway by using the IP Multimedia Subsystem (IMS) and the Session Initiation Protocol (SIP).

The metadata manager 122 manages service related metadata and stores the metadata in the SI&Metadata DB 711.

Also, the SI&Metadata DB 121 may store the service information decoded by the PSI&(PSIP and/or SI) Decoder 114, the metadata managed by the metadata manager 122, and the information necessary for selecting an SP provided by the service discovery manger 120.

Moreover, the SI&Metadata DB 121 may store setup data for a system, and for example, may be implemented using nonvolatile RAM (NVRAM) or flash memory.

In addition, the IG 750 may be a gateway having a collection of functions for accessing an IMS based IPTV service.

Figure 5:
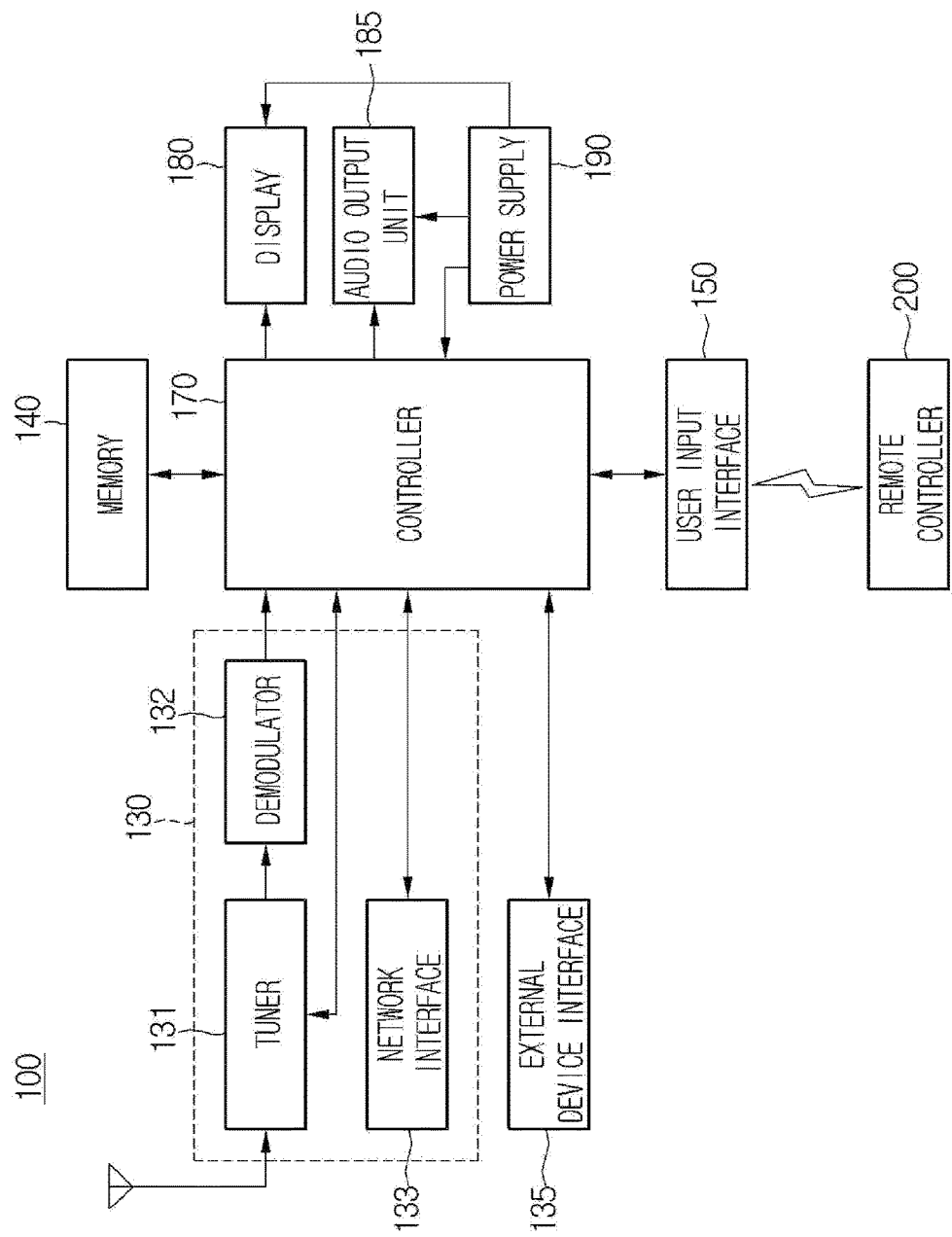
FIG. 5 is a block diagram illustrating a configuration of an image display device according to another embodiment of the present invention.

FIG. 5 is a block diagram illustrating a configuration of an image display device according to another embodiment of the present invention.

Referring to FIG. 5, the image display device 100 includes a broadcast receiving unit 130, an external device interface 135, a storage 140, a user input interface 150, a controller 170, a display 180, an audio output unit 185, and a power supply 190. Moreover, the broadcast receiving unit 130 may include a tuner 131, a demodulator 132, and a network interface 133.

The tuner 131 selects an RF broadcast signal corresponding to a channel selected by a user or pre-stored all channels from among radio frequency (RF) broadcast signals received through an antenna, and converts the selected RF broadcast signal into an intermediate frequency signal or a baseband image or sound signal.

For example, if the selected RF broadcast signal is a digital broadcast signal, the tuner 131 converts the selected RF broadcast signal into a digital IF signal DIF, and if the selected RF broadcast signal is an analog broadcast signal, the tuner 131 converts the selected RF broadcast signal into an analog baseband image or sound signal CVBS/SIF.

That is, the tuner 131 processes both a digital broadcast signal and an analog broadcast signal. The analog baseband image or sound signal CVBS/SIF outputted from the tuner 131 may be directly inputted to the controller 170.

Additionally, the tuner 131 may receive an RF broadcast signal of a single carrier according to the Advanced Television System Committee (ATSC) type or an RF broadcast signal of a plurality of carriers according to the Digital Video Broadcasting (DVB) type.

Moreover, the tuner 131 sequentially selects the RF broadcast signals of all broadcast channels stored through a channel memory function from among RF broadcast signals received through an antenna, and converts the selected RF broadcast signal into an intermediate frequency signal or a baseband image or sound signal.

The demodulator 132 may perform a demodulation operation by receiving the digital IF signal DIF converted by the tuner 131. For example, when the digital IF signal outputted from the tuner 131 is the ATSC type, the demodulator 132 may perform 8-Vestigal Side Band (VSB) demodulation.

Additionally, the demodulator 132 may perform channel decoding, and for this, may include a Trellis Decoder, a De-interleaver, and a Reed Solomon Decoder, so as to perform Trellis decoding, de-interleaving, and Reed Solomon decoding.

For example, when the digital IF signal outputted from the tuner 131 is the DVB type, the demodulator 132 may perform Coded Orthogonal Frequency Division Modulation (COFDMA) demodulation.

Additionally, the demodulator 132 may perform channel decoding, and for this, may include a convolution decoder, a De-interleaver, and a Reed Solomon Decoder, so as to perform convolution decoding, de-interleaving, and Reed Solomon decoding.

After performing demodulation and channel decoding, the demodulator 132 may output a stream signal TS, and the stream signal TS may be a signal that a video signal, an audio signal, or a data signal is multiplexed.

For example, the stream signal may be an MEPG-2 transport stream (TS) where a video signal of the MEPG-2 standard and an audio signal of the Dolby AC-3 standard are multiplexed. In more detail, the MPEG-2 TS may include a 4 byte header and a 184 byte payload.

Moreover, the demodulator 132 may include an ATSC demodulator and a DVB modulator, separately, according to the ATSC standard and the DVB standard.

The stream signal outputted from the demodulator 132 may be inputted to the controller 170. The controller 170 performs demultiplexing and audio/video signal processing, and then outputs an image to the display 180 and outputs sound to the audio output unit 185.

The external device interface 135 may access an external device and the image display device 100, and for this, may include an A/V input/output unit (not shown) or a wireless communication unit (not shown).

The external device interface 135 may be wire/wireless connected to an external device such as a digital versatile disk (DVD) player, a Blu ray player, a gaming console, a camera, a camcorder, and a computer (for example, a notebook computer).

Additionally, the external device interface 135 delivers a video, audio, or data signal inputted from the outside through a connected external device, to the controller 170 of the image display device 100, and outputs the video, audio, or data signal processed by the controller 170, to a connected external device.

The A/V input/output unit may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal in order to input video and audio signals of an external device to the image display device 100.

Moreover, the wireless communication unit may perform a short-range wireless communication with another electronic device. For example, the image display device 100 may be connected to another electronic device via a network according to communication standards such as Bluetooth, Radio Frequency Identification (RFID), infrared Data Association (IrDA), Ultra Wideband (UWB), ZigBee, and Digital Living Network Alliance (DLNA).

Additionally, the external device interface 135 may perform an input/output operation with a settop box in access to the settop box through at least one of the above-mentioned various terminals.

Moreover, the external device interface 135 receives an application or an application list in an adjacent external device and delivers it to the controller 170 or the storage 140.

The network interface 133 may provide an interface for connecting to a wired/wireless network including an internet network, to the image display device 100. For example, the network interface 133 may access a wired network through an Ethernet terminal, and may access a wireless network through communication standards such as Wireless LAN (WLAN) (for example, Wi-Fi), Wireless broadband (Wibro), World Interoperability for Microwave Access (Wimax), and High Speed Downlink Packet Access (HSDPA).

Moreover, the network interface 133 may transmit or receive data to or from another user or another electronic device through an accessed network or another network linked to an accessed network.

Additionally, some content data stored in the image display device 100 may be transmitted to another user preregistered to the image display device 100 or a selected user or electronic device of other electronic devices.

The network interface 133 may access a predetermined web page through an accessed network or another network linked to an accessed network. That is, in access to a predetermined web page via a network, data are transmitted to or received from a corresponding server.

Then, the network interface 133 may receive contents or data provided from a CP or a network operator. That is, the network interface 133 may receive contents such as movies, advertisings, games, VODs, and broadcast signals, which are provided from a CP or a network provider via a network, and information relating thereto.

Additionally, the network interface 133 may receive the update information and file of firmware provided from a network operator, and may transmit data to an Internet or content provider or a network operator.

The network interface 133 may select and receive a desired application among public applications open to the air via a network.

The storage 140 stores a program for each signal processing and control in the controller 170, and also stores processed video, audio, or data signals.

Additionally, the storage 140 may temporarily store video, audio or data signals inputted from the external device interface 135 or the network interface 133, and also may store information on a predetermined channel through a channel memory function.

The storage 140 may store an application or an application list inputted from the external device interface 135 or the network interface 133.

The storage 140 may include at least one type of a storage medium selected from flash memory type memory, hard disk type memory, multimedia card micro type memory, card type memory (for example, SD or XD memory), Random Access Memory (RAM), and Read-Only Memory (EE-PROM).

The image display device 100 may play content files stored in the storage 140, for example, video files, still image files, music files, document files, and application files, and then, may provide them to a user.

The user input interface 150 may deliver a signal that a user inputs to the controller 170, or may deliver a signal from the controller 170 to a user. For example, the user input interface 150 may receive a control signal for power on/off, channel selection, or screen setting from the remote controller 200 and then, may process the received control signal, or may transmit a control signal from the controller 170 to the remote controller 200, according to various communication types such as an RF communication type or an IR communication type.

Additionally, the user input interface 150 may deliver to the controller 170 a control signal inputted from a local key (not shown) such as a power key, a channel key, a volume key, or a setting key.

For example, the user input interface 150 may deliver to the controller 170 a control signal inputted from a sensor (not shown) sensing a user's gesture, or may transmit a signal from the controller 170 to a sensor (not shown).

Furthermore, the sensor (not shown) may include a touch sensor, an audio sensor, a position sensor, and a motion sensor.

The control unit 170 may demultiplex a stream inputted from the tuner 131, the demodulator 132, or the external device interface, or may process demultiplexed signals so as to generate and output a signal for video or audio.

A video signal image-processed by the controller 170 may be inputted to the display 180, and then, may be displayed as an image corresponding to a corresponding video signal. Additionally, a video signal image-processed by the controller 170 may be inputted to an external output device through the external device interface 135.

An audio signal processed by the controller 170 may be outputted to the audio output unit 185. Additionally, a sound signal processed by the controller 170 may be inputted to an external output device through the external device interface 135.

Although not shown in FIG. 5, the controller 170 may include a demultiplexer and an image processor.

Besides that, the controller 170 may control overall operations in the image display device 100. For example, the controller 170 controls the tuner 131 to tune an RF broadcast corresponding to a channel that a user selects or a pre-stored channel.

Additionally, the control unit 170 may control the image display device 100 by a user command inputted through the user input interface 150 or an internal program, and may download an application that a user wants or an application list into the image display device 100 in access to a network.

For example, the control unit 170 controls the tuner 131 to input a signal of a selected channel through the user input interface 150 according to a received predetermined channel select command, and processes video, audio, or data signals of a selected channel.

The controller 170 may allow channel information that a user selects to be outputted through the display 180 or the audio output unit 184, in addition to processed video or sound signals.

Additionally, the controller 170 allows video signals or audio signals from an external device such as a camera or a camcorder, which are inputted through the external device interface 135, to be outputted through the display 180 or the audio output unit 184 according to an external device image playback command received through the user input interface 150.

Furthermore, the controller 170 may control the display 180 to display an image. For example, a broadcast image inputted through the tuner 131, an external input image outputted through the external device interface 135, an image inputted through a network interface, or an image stored in the storage 140 may be controlled to be displayed on the display 180. In this case, an image displayed on the display 180 may be a still image or a moving image, and also may be a 2D or 3D image.

Additionally, the controller 170 may control contents stored in the image display device 100, broadcast contents received, or external input contents inputted from the external to be played. The contents may be in various formats such as broadcast images, external input images, audio files, still images, accessed web screen, and document files.

The controller 170 may control a home screen to be displayed on the display 180 according to an input for movement to the home screen.

The home screen may include a plurality of card objects classified by each content source. The card object may include at least one of a card object representing a thumbnail list of a broadcast channel, a card object representing a broadcast guide list, a card object representing a broadcast reservation or recording list, and a card object representing a media list in the image display device or a device connected to the image display device. Additionally, the card object may further include a card object representing a list of accessed external devices and a card object representing a list relating to a call.

In addition, the home screen may further include an application menu having at least one executable application item.

Moreover, when there is a card object movement input, the controller 170 may move and display a corresponding card object, or may move a card object not displayed on the display 180 to display it on the display 180.

When a predetermined card object is selected from a plurality of card objects in a home screen, the control unit 170 may control an image corresponding to a corresponding card object to be displayed on the display 180.

The controller 170 may control an object representing a received broadcast image and corresponding broadcast image related information to be displayed in a card object representing a broadcast image. Then, the size of such a broadcast image may be fixed by lock setting.

Additionally, the controller 170 may control a setup object for at least one setting of video setting, audio setting, screen setting, reservation setting, pointer setting of a remote controller, and network setting in an image display device to be displayed, and also may control an object for a login, help, or exit item to be displayed in a certain area of the home screen.

Moreover, the controller 170 may control an object representing the number of entire card objects or the number of card objects displayed on the display 180 among the entire card objects to be displayed in a certain area of the home screen.

When a card object name in a predetermined card object among card objects displayed on the display 180 is selected, the control unit 170 may control a corresponding card object to be displayed on the display 180 in a full screen.

When an incoming call is received in an accessed external device or an image display device, the controller 170 focuses on a call related card object among a plurality of card objects and displays it, or moves a call related card object to the display 180 and displays it.

Furthermore, when entering an application viewing item, the controller 170 may control an application or application list downloadable into the image display device 100 or from an external network to be displayed.

The controller 170 may control an application downloaded from an external network to be installed or driven in addition to various user interfaces. Furthermore, an image relating to an executed application may be controlled to be displayed on the display 180 by a user's selection.

Moreover, although not shown in FIG. 5, the image display device 100 may further include a channel browsing processor generating a thumbnail image corresponding to a channel signal or an external input signal.

The channel browsing processor receives a stream signal TS outputted from the demodulator 132 or a stream signal outputted from the external device interface 135, and then, extracts an image from the inputted stream signal to generate a thumbnail image.

The generated thumbnail image is inputted to the controller 170 as it is or after it is encoded, or may be encoded into a stream format to be inputted to the controller 170.

The controller 170 may display a thumbnail list including a plurality of thumbnail images on the display 180 by using inputted thumbnail images, and the thumbnail images in the thumbnail list may be sequentially or simultaneously updated. Accordingly, a user may simply understand the contents of a plurality of broadcast channels.

The display 180 may convert the video signal, data signal, and OSD signal that are processed by the controller 170 or the video signal and data signal that are received through the external device interface 135 into R, G, and B signals, respectively, so as to generate driving signals.

For this, the display 180 may be PDP, LCD, OLED, flexible display, or 3D display, or may be configured with a touch screen to be used as both an input device and an output device.

The audio output unit 185 receives a signal sound-processed by the controller 170, for example, a stereo signal, a 3.1 channel signal, or a 5.1 channel signal, and outputs it as sound, and for this, may include various forms of speakers.

Moreover, the image display device 100 may further include a capturing unit (not shown) obtaining an image of a user, and image information obtained by the capturing unit (not shown) may be inputted to the controller 170.

In this case, the controller 170 may sense a user's gesture by using each or a combination of an image captured by the capturing unit (not shown) and a signal detected from the sensing unit (not shown).

The power supply 190 supplies corresponding power throughout the image display device 100. For example, the power supply 190 may supply power to the controller 170, the display 180, and the audio output unit 185, which may be realized in the form of a system on chip (SOC).

For this, the power supply 190 may include a converter that converts AC power to DC power, and when the display 180 is implemented as a liquid crystal panel including a plurality of backlight lamps, an inverter (not shown) capable of performing a PWM operation may be further included in order for variable brightness or dimming driving.

The remote controller 200 transmits a user input to the user input interface 150. For this, the remote controller 200 may operate through Bluetooth, RF communication, IR communication, Ultra Wideband (UWB), or ZigBee.

Additionally, the remote controller 200 receives video, audio, data signals outputted from the user input interface 150, and display them on the remote controller 200 or output them as sound or vibration.

The image display device 100 may be a fixed type digital broadcast receiver receiving at least one of ATSC type (8-VSB type) digital broadcast, DVB-T type (COFDM type) digital broadcast, and ISDB-T type (BST-OFDM type) digital broadcast.

Moreover, since the image display device 100 of FIG. 5 is just one embodiment of the present invention, some of the shown components may be integrated, added, or omitted depending on the specification of the image display device 100.

That is, if necessary, at least two components may be integrated into one component, or one component is divided into at least two components in order for configuration. Additionally, a function performed by each block is used for describing an embodiment of the present invention, and its specific operation or device does not limit the scope of the present invention.

According to another embodiment of the present invention, unlike FIG. 5, the image display device 100 may not include the tuner 131 and the demodulator 132, and also, may receive an image through the network interface 133 or the external device interface 135 and then may play it.

For example, the image display device 100 may separately include an image processing device such as a settop box to receive broadcast signals or content according to various network services and a content playback device playing content inputted from the image processing device.

In this case, a method of providing a network service according to an embodiment of the present invention may be performed by an image processing device such as the separated settop box or a content playback device including the display 180 and the audio output unit 185, in addition to the image display device 100 described with reference to FIG. 5.

Figure 6:
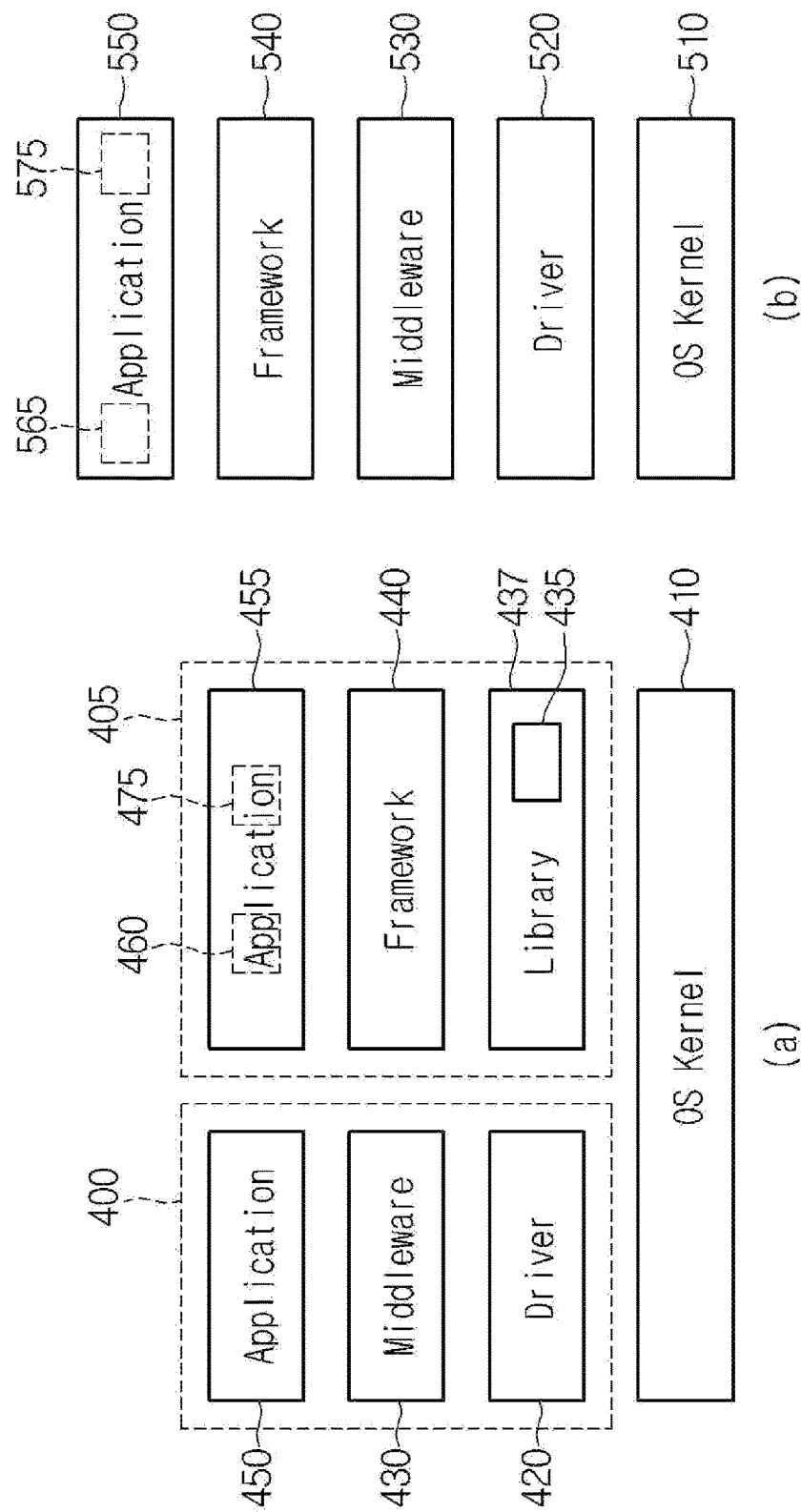
FIG. 6 is a view illustrating a platform structure of an image display device according to an embodiment of the present invention.

FIG. 6 is a view illustrating platform structures of an image display device according to embodiments of the present invention. The platform of the image display device 100 may include OS based software to perform the above-mentioned various operations.

Referring to FIG. 6(a), the platform of the image display device 100, as a separated platform, may separately include a legacy system platform 400 and a smart system platform 405 in terms of design.

An OS kernel 410 may be commonly used in the legacy system platform 400 and the smart system platform 405. The legacy system platform 400 may include a driver 420, a middleware 430, and an application layer 450 on the OS kernel 410.

Moreover, the smart system platform 405 may include a library 435, a framework 440, and an application layer 455 on the OS kernel 410.

The OS kernel 410, as the core of the operating system, may provide hardware driver drive during the driving of the image display device 100, security of hardware and a processor in the image display device 100, efficient management of a system source, memory management, interface provision on hardware by hardware abstraction, a multi processor, schedule management according to a multi processor, and power management.

For example, the hardware driver in the OS kernel 410 may include at least one of a display driver, a Wi-Fi driver, a Bluetooth driver, a USB driver, an audio driver, a power management, a binder driver, and a memory driver.

Additionally, the hardware driver in the OS kernel 410, as a driver for a hardware device in the OS kernel 410, may include a character device driver, a block device driver, and a network device driver.

Moreover, the block device driver may include a buffer storing data by a unit size as data are transmitted by a specific block unit. The character device driver may not include the buffer as data are transmitted by a basic data unit, i.e., a character unit.

The OS kernel 410 may be implemented using various OS (for example, Unix (Linux) or Window) based kernels. Moreover, as an open OS kernel, the OS kernel 410 may be used in other electronic devices.

The driver 420 is disposed between the OS kernel 410 and the middleware 430, and drives a device to operate the application layer 450 in addition to the middleware 430.

For example, the driver 420 may include drivers of a micom, a display module, a graphic processing unit (GPU), a frame rate converter (FRC), a General Purpose Input/Output Pin (GPIO), an HDMI, a System Decoder (SDEC), a demultiplexer, a Video Decoder (VDEC), an Audio Decoder (ADEC), a Personal Video Recorder (PVR), or an Inter-Integrated Circuit (I2C). The above drivers may operate in linkage with a hardware driver in the OS kernel 410.

Moreover, the driver 420 may further include a driver of the remote controller 200, for example, a spatial remote controller. Beside the driver 420, the driver of the spatial remote controller may be variously installed in the OS kernel 410 or the middleware 430.

The middleware 430 is disposed between the OS kernel 410 and the application layer 450 and serves as a medium role to exchange data between another hardware or software. Accordingly, the middleware 430 may provide a standardized interface, so that various environments are supported and interoperability is possible with other tasks having different systems.

For example, the middleware 430 of the legacy system platform 400 may include the middleware of the Multimedia and Hypermedia information coding Experts Group (MHEG) and the Advanced Common Application Platform (ACAP) (i.e., data broadcast related middleware), the middleware of PSIP or SI (i.e., broadcast information related middleware), and DLNA middleware (i.e. peripheral communication related middleware).

Moreover, the application layer 450 on the middleware 430, i.e., the application layer 450 in the legacy system platform 400, may include a user interface application on various menus in the image display device 100.

The application layer 450 on the middleware 430 may be edited by a user's selection, and may be updated via a network. By using the application layer 450, it is possible to enter a desired menu among various user interfaces according to an input of a remote controller while a user watches a broadcast image.

Additionally, the application layer 450 in the legacy system platform 400 may include at least one of TV guide application, Bluetooth application, reservation application, Digital Video Recorder (DVR) application, and hotkey application.

Moreover, the library 435 in the smart system platform 405 may be disposed between the OS kernel 410 and the framework 440, and may form the basic of the framework 440. For example, the library 435 may include a secure socket layer (SSL) (i.e., a security related library), a WebKit (i.e., a web engine related library), a libc (i.e., a c library), and a media framework (i.e., a media related library such as a video format and an audio format), and may be exposed to a developer through the framework 440, as it is written based on C or C++.

The library 435 may include a runtime 437 including a core java library and a virtual machine (VM), and the runtime 437 may form the basic of the framework 440 together with the library 435.

The VM may perform a plurality of instances, i.e., multitasking. Moreover, according to each application in the application layer 55, each VM may be allocated and executed. In this case, in order for schedule adjustment or interconnect between a plurality of instances, a binder driver (not shown) may operate in the OS kernel 410.

Moreover, the binder driver and the runtime 437 may connect a java based application with a C based library, and the library 435 and the runtime 437 may correspond to the middleware of a legacy system.

Moreover, the framework 440 in the smart system platform 405 includes a program that is the basis of an application in the application layer 455. The framework 440 is compatible with any application, and the reuse, move, or exchange of a component is possible.

The framework 440 may include a support program and a program binding other software components. For example, the framework 440 may include a resource manager, an activity manager relating to the activity of an application, a notification manager, and a content provider summarizing share information between applications.

The application layer 455 on the framework 440 includes various programs driven and displayable in the image display device 100, and for example, may include a core application including at least one of an email, a short message service (SMS), a calendar, a map, and a browser.

Moreover, the framework 440 or the application layer 450 may be written based on JAVA.

Moreover, the application layer 455 may include an application 465 stored in the image display device 100 and undeletable by a user and an application 475 downloaded via a network and stored and freely installed and deleted.

Through an application in the application layer 455, internet call service by network access, VOD service, web album service, SNS, location based service (LBS), map service, web search service, and application search service may be performed. Moreover, various functions such as games and schedule management may be performed.

Moreover, as shown in FIG. 6(b), the platform of the image display device 100, as an integrated platform, may include an OS kernel 510, a driver 520, a middleware 530, a framework 540, and an application layer 550.

Compared to FIG. 6(a), the platform shown in FIG. 6(b) has differences in that the library 435 is omitted and the application layer 550 is provided as an integrated layer. Besides that, the driver 520 and the framework 540 are identical.

The platform of FIGS. 6(a) and 6(b) may be generally used in various electronic devices in addition to the image display device 100, and may be stored or loaded into the storage 140 and controller 170 of FIG. 5, or an additional processor (not shown).

Furthermore, the platform may be stored or loaded into the SI&metadata DB 121, UI manager 124, and service manager 123 of FIG. 4, and may further include an additional application processor (not shown), for executing the application.

Figure 7:
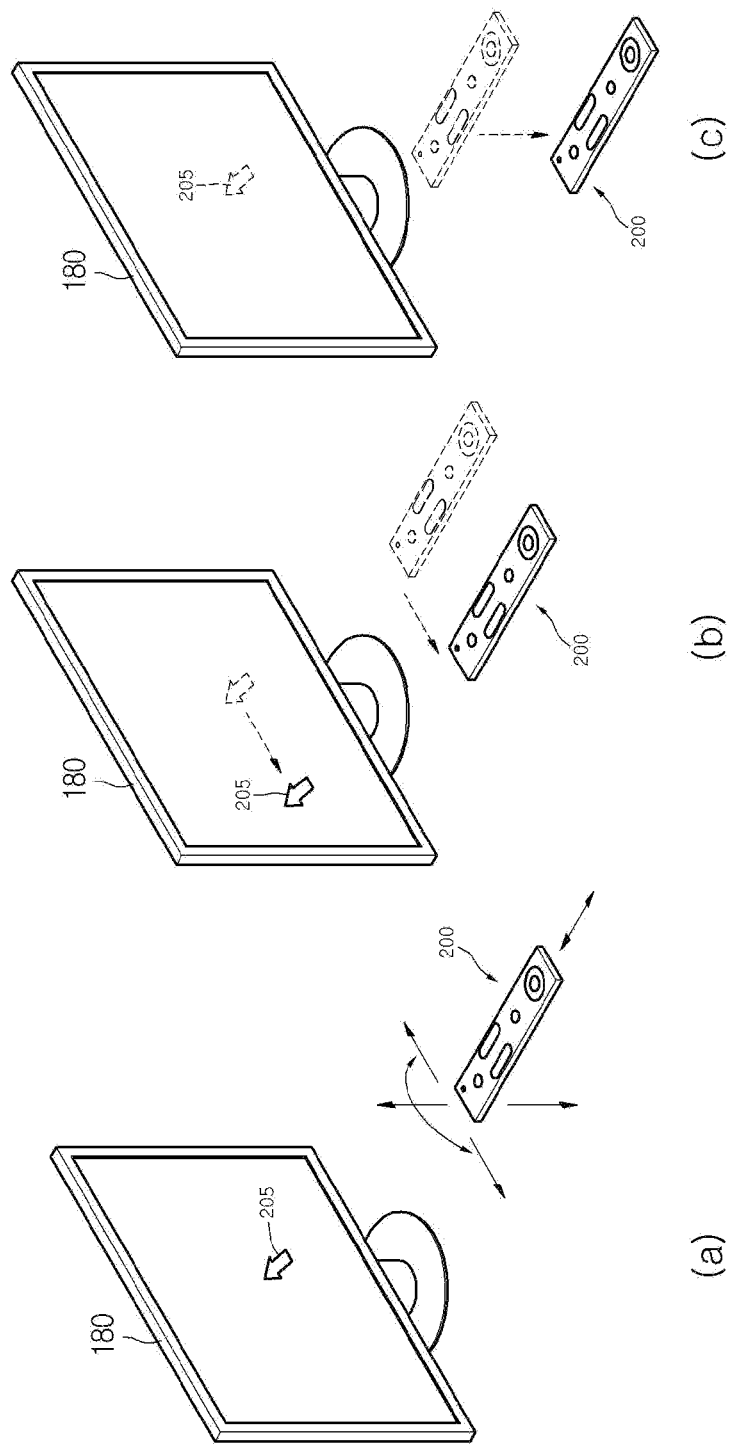
FIG. 7 is a view illustrating a method of controlling an operation of an image display device through a remote controller according to an embodiment of the present invention.

FIG. 7 is a view illustrating a method of controlling an operation of an image display device according to an embodiment of the present invention.

As shown in FIG. 7(a), a pointer 205 corresponding to a remote controller 200 is exemplarily displayed on a display 180.

A user may move or rotate the remote controller 200 up and down, left to right (FIG. 13(b)), or back and forth (FIG. 13(c)). The pointer 205 displayed on the display 180 of the image display device corresponds to the movement of the remote controller 200. The remote controller 200 may be called a spatial remote controller because as shown in FIG. 7, the corresponding pointer 205 is moved and displayed according to the movement on a 3D space.

As shown in FIG. 7(b), when a user moves the remote controller 200 to the left, the pointer 205 displayed on a display 180 exemplarily moves to the left according to thereto.

Information on the movement of the remote controller 200 sensed through a sensor of the remote controller 200 is transmitted to the image display device. The image display device may calculate the coordinates of the pointer 205 from the information on the movement of the remote controller 200. The image display device may display the pointer 205 in correspondence to the calculated coordinates.

As shown in FIG. 7(c), while a specific button is pressed in the remote controller 200, a user moves the remote controller 200 away from the display 180 exemplarily. Due to this, a selected area corresponding to the pointer 205 in the display 180 may be zoomed in and enlarged.

On the contrary, when a user moves the remote controller 200 close to the display 180, a selected area corresponding to the pointer 205 in the display unit 180 may be zoomed out and reduced.

Moreover, when the remote controller 200 is away from the display 180, a selected area is zoomed out, and when the remote controller 200 is closer to the display 180, a selected area is zoomed in.

Furthermore, while a specific button is pressed in the remote controller 200, the recognition of up and down or left and right movements may be eliminated. That is, when the remote controller 200 moves away from or closer to the display 180, the up, down, left, and right movements are not recognized and only the back and forth movements are recognized. While a specific button is not pressed in the remote controller 200, the pointer 205 moves only according to the up, down, left, and right movements of the remote controller 200.

Moreover, a moving speed or direction of the pointer 205 may correspond to a moving speed or direction of the remote controller 200.

Furthermore, the pointer 205 in this specification means an object displayed on the display 180 in correspondence to an operation of the remote controller 200. Accordingly, the besides the arrow form shown as the pointer 205, various forms of objects are available. For example, an object form may be a point, a cursor, a prompt, and a think outline. Also, the pointer 205 may be displayed in correspondence to on point of the horizontal axis and the vertical axis on the display 180, and also may be displayed in correspondence to a plurality of points such as a line or a surface.

Figure 8:
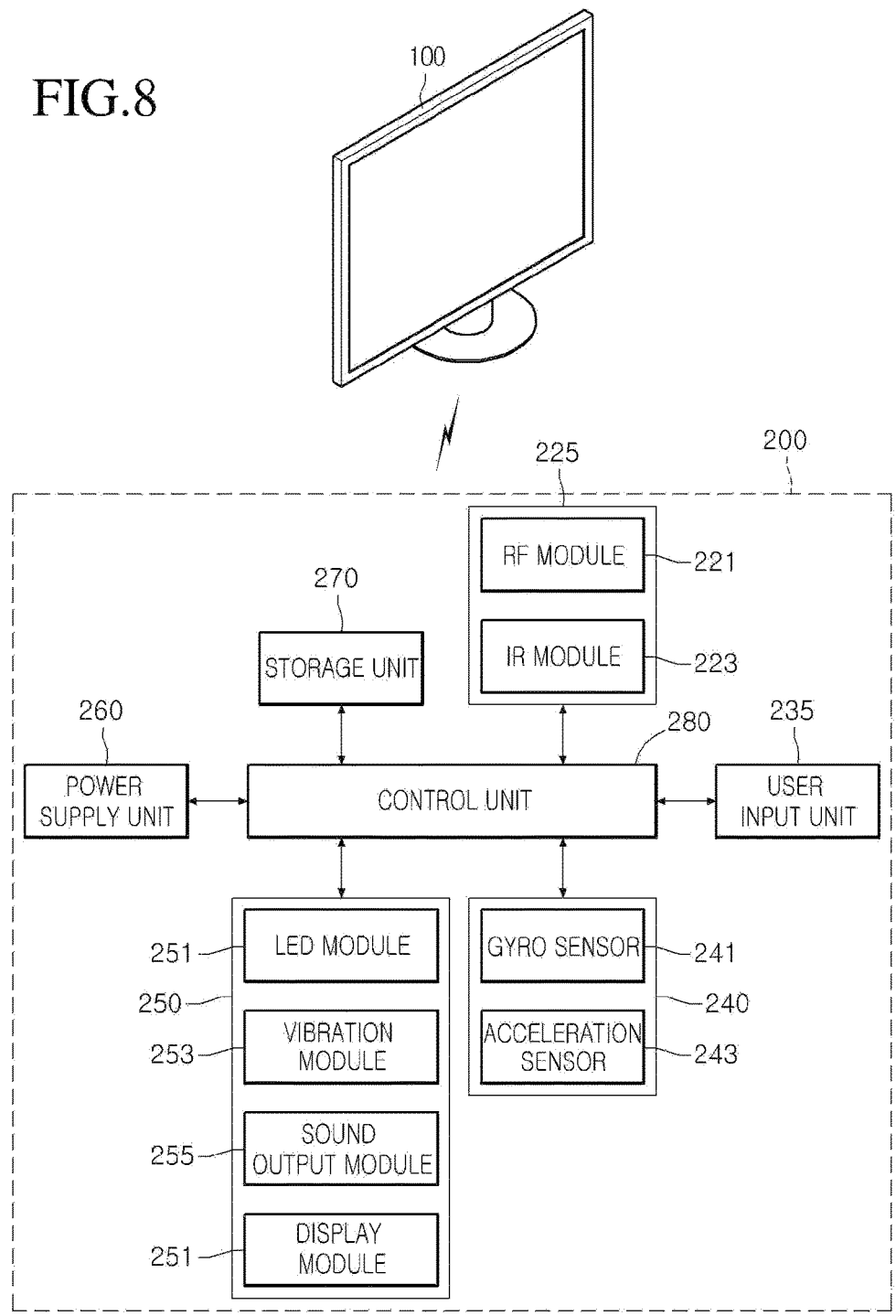
FIG. 8 is a block diagram illustrating a configuration of a remote controller according to an embodiment of the present invention.

FIG. 8 is a block diagram illustrating a configuration of a remote controller according to an embodiment of the present invention. The remote controller 200 includes a wireless communication unit 225, a user input unit 235, a sensing unit 240, an output unit 250, a power supply unit 260, a storage unit 270, and a control unit 280.

Referring to FIG. 8, the wireless communication unit 225 may transmit/receive a signal to/from one of the image display devices according to the embodiments of the present invention.

The remote controller 200 includes an RF module 221 for transmitting/receiving a signal to/from the image display device 100 according to the RF communication standard, and an IR module 223 for transmitting/receiving a signal to/from the image display device 100 according to the IR communication standard.

Moreover, the remote controller 200 transmits signals containing information on the movement of the remote controller 200 to the image display device 100 through the RF module 221.

Furthermore, the remote controller 200 receives the signal that the image display device 100 transmits through the RF module 221, and if necessary, may transmit a command on power on/off, channel change, or volume change to the image display device 100 through the IR module 223.

The user input unit 235 may include a keypad, a button, a touch pad, or a touch screen. A user may input a command relating to the image display device 100 to the remote controller 200 by manipulating the user input unit 235. When the user input unit 235 includes a hard key button, a user may input a command relating to the image display device 100 to the remote controller 200 through a push operation of the hard key button.

When the user input unit 235 includes a touch screen, a user may input a command relating to the image display device 100 to the remote controller 200 by touching a soft key of the touch screen. Additionally, the user input unit 235 may include various kinds of input means that a user can manipulate, such as a scroll key and a jog key, and the present invention is not limited thereto.

The sensing unit 240 may include a gyro sensor 241 and an acceleration sensor 243. The gyro sensor 241 may sense information on the movement of the remote controller 200.

For example, the gyro sensor 241 may sense information on an operation of the remote controller 200 on the basis of x, y, and z axes, and the acceleration sensor 243 may sense information on a moving speed of the remote controller 200. Furthermore, the remote controller 200 may further include a distance measuring sensor to sense the distance between the remote controller 200 and the display 180 of the image display device 100.

The output unit 250 may output video or audio signals in correspondence to the manipulation of the user input unit 235 or the signals transmitted from the image display device 100. A user may recognize whether the user input unit 235 is manipulated or whether the image display device 100 is controlled through the output unit 250.

For example, the output unit 250 may include an LED module 251 turned on when the user input unit 235 is manipulated or a signal is transmitted from the image display device 100 through the wireless communication unit 225, a vibration module 253 generating vibration, a sound output module 255 outputting sound, or a display module 257 outputting an image.

In addition, the power supply unit 260 supplies power to the remote controller 200. When the remote controller does not move for a predetermined time, power supply stops, so that power consumption is reduced. The power supply unit 260 may restart power supply when a predetermined key in the remote controller 200 is manipulated.

The storage unit 270 may store several kinds of programs and application data necessary for a control or operation of the remote controller 200. If the remote controller 200 transmits/receives a signal to/from the image display device 100 wirelessly through the RF module 221, the remote controller 200 and the image display device 100 transmits/receive a signal through a predetermined frequency band.

The control unit 280 of the remote control device 200 may store in the storage unit 270 the information regarding a frequency band used for wirelessly transmitting/receiving a signal to/from the image display device 100 paired with the remote controller 200, and then may refer to it.

The control unit 280 controls all the various matters relating to a control of the remote controller 200. The control unit 280 may transmit a signal corresponding to a predetermined key manipulation the user input unit 235 or a signal corresponding to the movement of the remote controller 200 sensed by the sensing unit 240, to the image display device 100 through the wireless communication unit 225.

Figure 9:
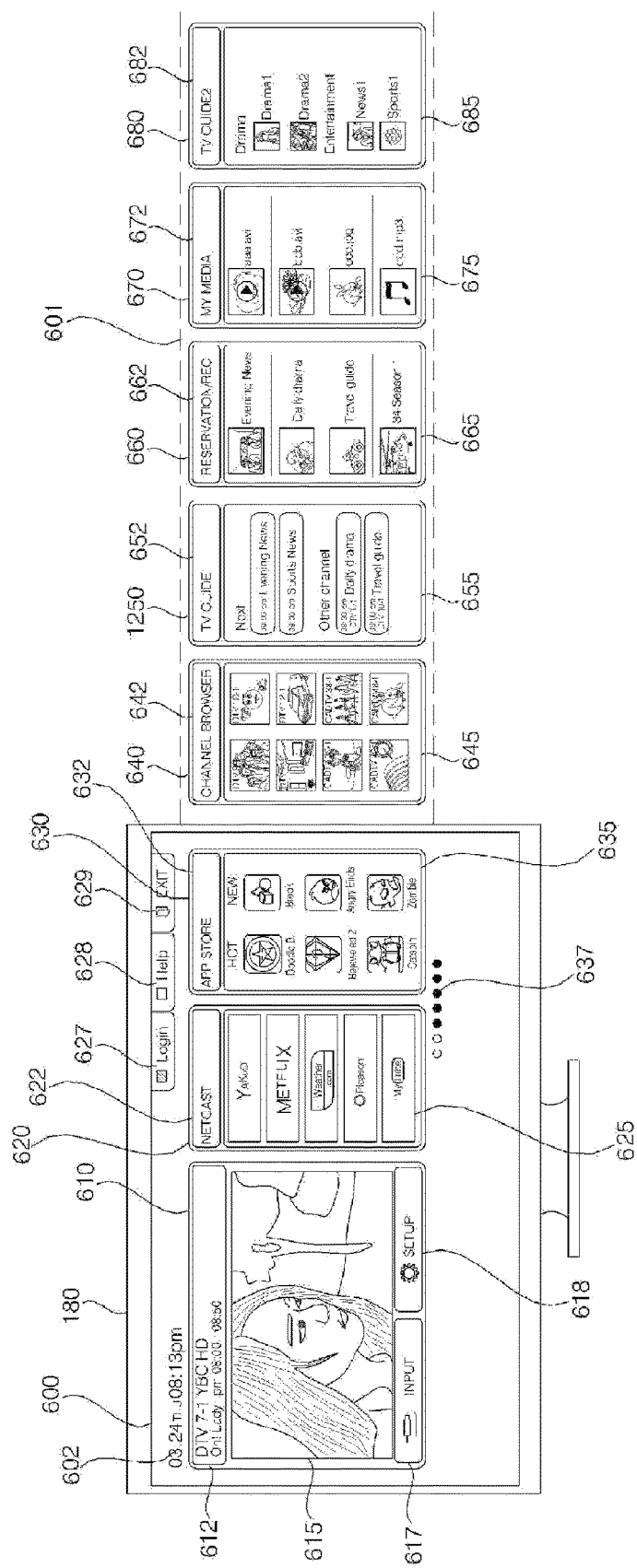
FIG. 9 is a view illustrating a configuration of a home screen displayed on an image display device according to an embodiment of the present invention.

FIG. 9 is a view illustrating a configuration of a home screen displayed on an image display device according to an embodiment of the present invention.

The home screen configuration shown in FIG. 9 may be one example of a basic screen configuration of the image display device 100. Such a screen may be set to an initial screen displayed when power is on or power is on from a standby mode or a basic screen by an operation of a local key (not shown) or a home key in the remote controller 200.

Referring to FIG. 9, a home screen 600 may include a card object area. The card object area may include a plurality of card objects 610, 620, and 630 divided by each content source.

As shown in FIG. 9, the card object BROADCAST 610 displaying a broadcast image, the card object NETCAST 620 displaying a CP list, and the card object APP STORE 630 displaying a list of applications provided are displayed on the display 180.

Additionally, as shown in FIG. 9, as a card object not displayed on the display 180 but disposed in a hidden area 601 or replaced and displayed when a card object moves, provided are a card object CHANNEL BROWSER 640 representing a broadcast channel thumbnail list, a card object TV GUIDE 650 representing a broadcast guide list, a card object RESERVATION/REC 660 representing a broadcast reservation list or recording list, a card object MY MEDIA 670 representing a media list in an image display device or a device attached to the image display device, and a card object TV GUIDE2 680 representing a broadcast guide list.

The card object BROADCAST 610 displaying a broadcast image may include a broadcast image 615 received through the tuner 110 or the network interface 130, an object 612 representing corresponding broadcast image related information, an object representing an external device, and a setup object 618.

The broadcast image 615 is displayed as a card object, and its size is fixed by a lock function, so that a user may continuously view a broadcast image.

The broadcast image 615 may have a size changed by a user's manipulation. For example, the size of the corresponding broadcast image 615 may be enlarged or reduced by drag using the pointer 205 of the remote controller 200. By such enlargement or reduction, the number of card objects displayed on the display 180 may be two or four instead of three shown in FIG. 9.

Moreover, when the broadcast image 615 in the card object is selected, a corresponding broadcast image may be displayed on the display 180 in full screen.

The object 612 representing corresponding broadcast image related information may include a channel number (DTV7-1), a channel name (YBC HD), a broadcast program name (Oh! Lady), and a broadcast time (pm 08:00~08:50). By this, a user may intuitively recognize information on the broadcast image 615 displayed.

Moreover, when the object 615 representing corresponding broadcast image related information is selected, related EPG information may be displayed on the display 180.

Moreover, an object 602 representing a date (03.24), a weekday (THU), and a current time (pm 08:13) may be displayed on the card object representing a broadcast image. By this, a user may intuitively recognize time information.

An object 617 representing an external device may represent an external device attached to the image display device 100. For example, when the corresponding object 617 is selected, a list of external devices attached to the image display device 100 may be displayed.

A setup object 618 may be used for inputting various settings of the image display device 100. For example, various settings such as video setting, audio setting, screen setting, reservation setting, pointer setting of the remote controller 200, and network setting may be performed.

Moreover, the card object 620 representing a CP list may include a card object name NETCAST 622 and a CP list 625.

In the drawing, as a CP in the CP list 625, Yakoo, Metflix, weather.com, Picason, and My tube are shown, but various settings are possible.

When the card object name 622 is selected, the corresponding card object 620 may be displayed on the display 180 in full screen.

Moreover, when a predetermined CP is selected from the CP list 625, a screen including a content list that a corresponding CP provides may be displayed on the display 180.

The card object 630 representing a list of applications provided may include a card object name APP STORE 632 and an application list 635. The application list 635 is a list where applications in an application store are classified by each item and aligned. Although applications are aligned by HOT and NEW and displayed, the present invention is not limited thereto, and thus various examples are possible.

When the card object name 632 is selected, the corresponding card object 630 may be displayed on the display 180 in full screen.

Moreover, when a predetermined application item is selected from the application list 635, a screen including information on a corresponding application may be displayed on the display 180.

A login item 627, a help item 628, and an exit item 629 may be displayed above the card objects 620 and 630.

The login item 627 may be used for accessing an app store or logging in a network connected to an image display device. The help item 628 may be used for using a help when the image display device 100 operates. The exit item 629 may be used for attempting to exit a corresponding home screen. At this point, a received broadcast image may be displayed in full screen.

An object 637 representing the number of entire card objects may be displayed below the card objects 620 and 630. The object 637 may represent the number of entire card objects and also the number of card objects displayed on the display 180 among the entire card objects.

Moreover, the card object 640 representing a broadcast channel thumbnail list may include a card object name CHANNEL BROWSER 642 and a broadcast channel thumbnail list 645. Although sequentially received broadcast channels are displayed as thumbnail images in FIG. 9, the present invention is not limited thereto, and thus videos are possible. A thumbnail list may include thumbnail images and channel information on a corresponding channel simultaneously. By this, a user may intuitively recognize content of a corresponding channel.

Such a thumbnail image may be a thumbnail image for a favorite channel that a user preregisters or a thumbnail image for a channel after or before the broadcast image 615 in the card object 610. Moreover, eight thumbnail images are shown in FIG. 9 but various settings are possible. Moreover, thumbnail images in a thumbnail list may be updated.

When the card object name 642 is selected, the corresponding card object 640 may be displayed on the display 180 in full screen. That is, content on a thumbnail list may be displayed on the display 180.

Moreover, when a predetermined application item is selected from the application list 645, a screen including information on a corresponding application may be displayed on the display 180.

The card object 650 representing a broadcast guide list may include a card object name TV GUIDE 652 and a broadcast guide list 655. The broadcast guide list 655 may be a list for a broadcast image of a broadcast program after the broadcast image 615 in the card object 610 or another channel, but is not limited thereto. Various examples are possible.

In addition, when the card object name 652 is selected, the corresponding card object 650 may be displayed on the display 180 in full screen.

Moreover, when a predetermined broadcast item is selected from the broadcast guide list 655, a broadcast image corresponding to a corresponding broadcast item may be displayed on the display 180, or broadcast information corresponding to a corresponding broadcast item may be displayed on the display 180.

Moreover, the card object 660 representing a broadcast channel thumbnail list may include a card object name CHANNEL BROWSER 662 and a broadcast channel thumbnail list 665. A broadcast reservation list or a recording list 665 may be a list including broadcast items that a user reserves in advance or broadcast items recorded according thereto. Although thumbnail images are displayed by each corresponding item in the drawing, various examples are possible.

In addition, when the card object name 662 is selected, the corresponding card object 660 may be displayed on the display 180 in full screen.

Furthermore, a pre-reserved broadcast item or a recorded broadcast item is selected from the broadcast reservation list or the recording list 665, broadcast information on a corresponding broadcast or a recorded broadcast image may be displayed on the display 180.

The card object 670 representing a media list may include a card object name MY MEDIA 672 and a media list 675. The media list 675 may be a media list in the image display device 100 or a device attached to the image display device 100. Although video, still images, and audio are shown in the drawing, various examples such as text document and e-book document are possible.

In addition, when the card object name 672 is selected, the corresponding card object 670 may be displayed on the display 180 in full screen.

Moreover, when a predetermined media item is selected from the media list 675, a corresponding media may be executed, and a screen corresponding to a corresponding media may be displayed on the display 180.

The card object TV GUIDE2 680 representing a broadcast guide list may include a card object name TV GUIDE2 682 and a broadcast guide list 685. The broadcast guide list 685 may be a broadcast type guide list. Although the broadcast type list is shown by drama or entertainment such as news and sports in the drawing, various settings are possible. That is, the broadcast type list may be a list of broadcast types such as drama, movie, news, sports, and animation. By this, a user may confirm a guide list where broadcasts are divided by genres.

When the card object name 682 is selected, the corresponding card object 680 may be displayed on the display 180 in full screen.

Moreover, when a predetermined broadcast item is selected from the broadcast guide list 685, a screen corresponding to a corresponding broadcast image may be displayed on the display 180.

The card objects 620 and 630 displayed on the display 180 and the card objects 640, 650, 660, 670, and 680 not displayed on the display 180 and disposed in the hidden area 601 may be replaced with each other according to a movement input of a card object.

That is, at least one of the card objects 620 and 630 displayed on the display 180 may be moved to the hidden area 601, and at least one of the card objects 640, 650, 660, 670, and 680 disposed in the hidden area 601 may be displayed on the display 180.

Moreover, the home screen 600 of the image display device 100 may further include a card object representing information relating to software update.

According to an embodiment of the present invention, as mentioned above, when a drag and drop operation of a user is inputted for one of a plurality of objects displayed on the home screen 600 of the image display device 100, the position and size of the requested object is adjusted and displayed in order not to hide another object.

The drag and drop, as a gesture made by a user by using a specific input means in a GUI environment, is a user interface method including one operation consisting of selecting a specific object by using the input means and moving it to a specific position.

For example, the drag means that while a specific button in the input means is pressed, an object is moved to a specific position by moving the input means. The drop means that the button pressed during the drag is released, the object is positioned at a specific position.

In more detail, an object at one position of a screen is selected and dragged as it is by using the input means, and then dropped at another position of the screen, so that the drag and drop operation is performed. In this case, a task corresponding to the position where the object is dropped may be performed.

The drag and drop operation uses an intuitive graphic interface, and a desired task on a specific object is performed by the one connected drag and drop operation, so that a user may adapt it easily.

According to an embodiment of the present invention, a user drags a specific object displayed on a screen by using an input means, and drops it at a drop position displayed on the screen, so that the object is moved in an area corresponding to the drop position and then is displayed.

Furthermore, an input drop to perform the drag and drop operation may be the remote controller 200 connected to the image display device 100 through a wired or wireless communication method, or may be a device sensing the movement of any part of the body such as the finger or eye of a user.

For example, the remote controller 200 may be an input means such as a spatial remote controller or a mouse, which recognize a user's motion and transmits a signal corresponding thereto to the image display device 100.

Furthermore, the image display device 100 may include a touch panel sensing the position contacted by a specific object or the movement of the contacted object. Therefore, a user contacts a screen by using the finger or a specific object to perform the drag and drop operation.

In addition, the image display device 100 may include a sensing unit sensing the movement of a user's eye. Therefore, the drag and drop operation may be inputted according to the movement of a user's eye.

Figure 10:
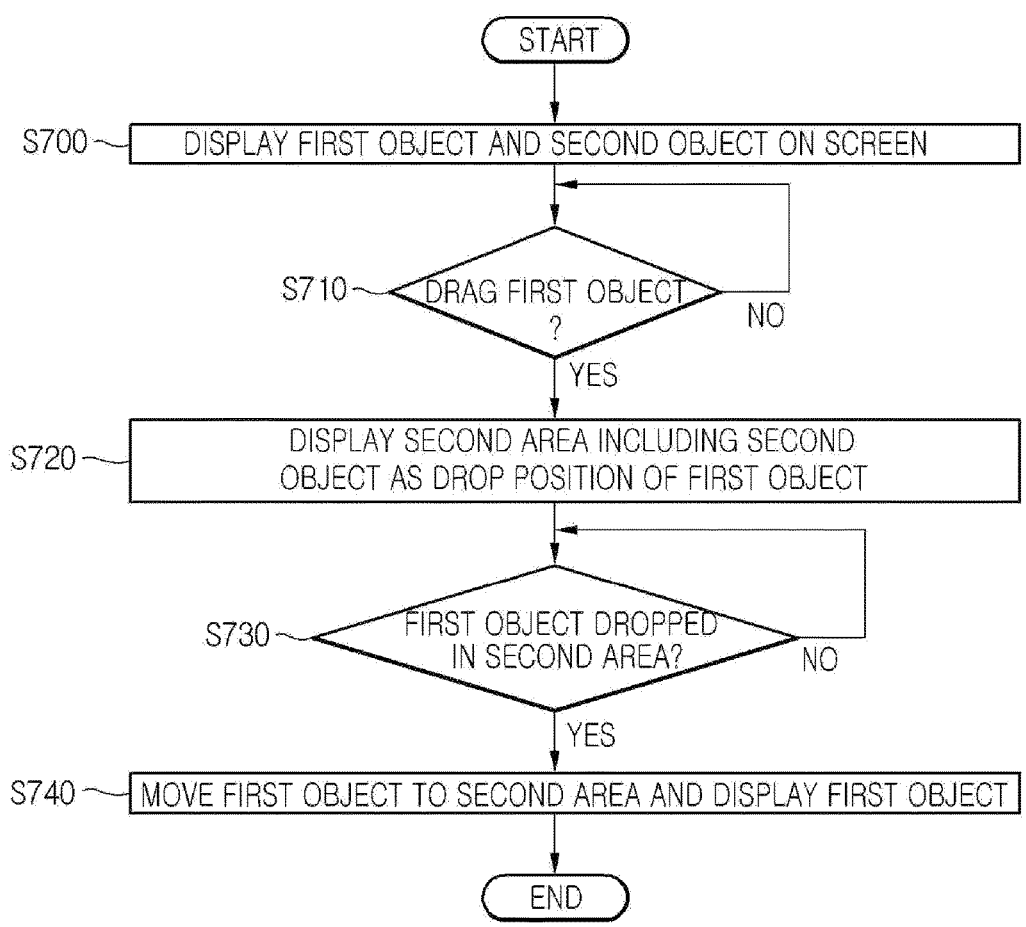
FIG. 10 is a flowchart illustrating a method of controlling a screen of an image display device according to an embodiment of the present invention.

FIG. 10 is a flowchart illustrating a method of controlling a screen of an image display device according to an embodiment of the present invention. This method is described in linkage with the block diagram representing the configuration of the image display device of FIG. 5.

Referring to FIG. 10, the display 180 of the image display device 100 is controlled by the control unit 170 and then, displays a first object and a second object on a screen in operation S700.

For example, the display 180 may display the home screen 600 including a plurality of objects as shown in FIG. 9, and each of the first and second objects may be one of the objects described with reference to FIG. 9.

Figure 11:
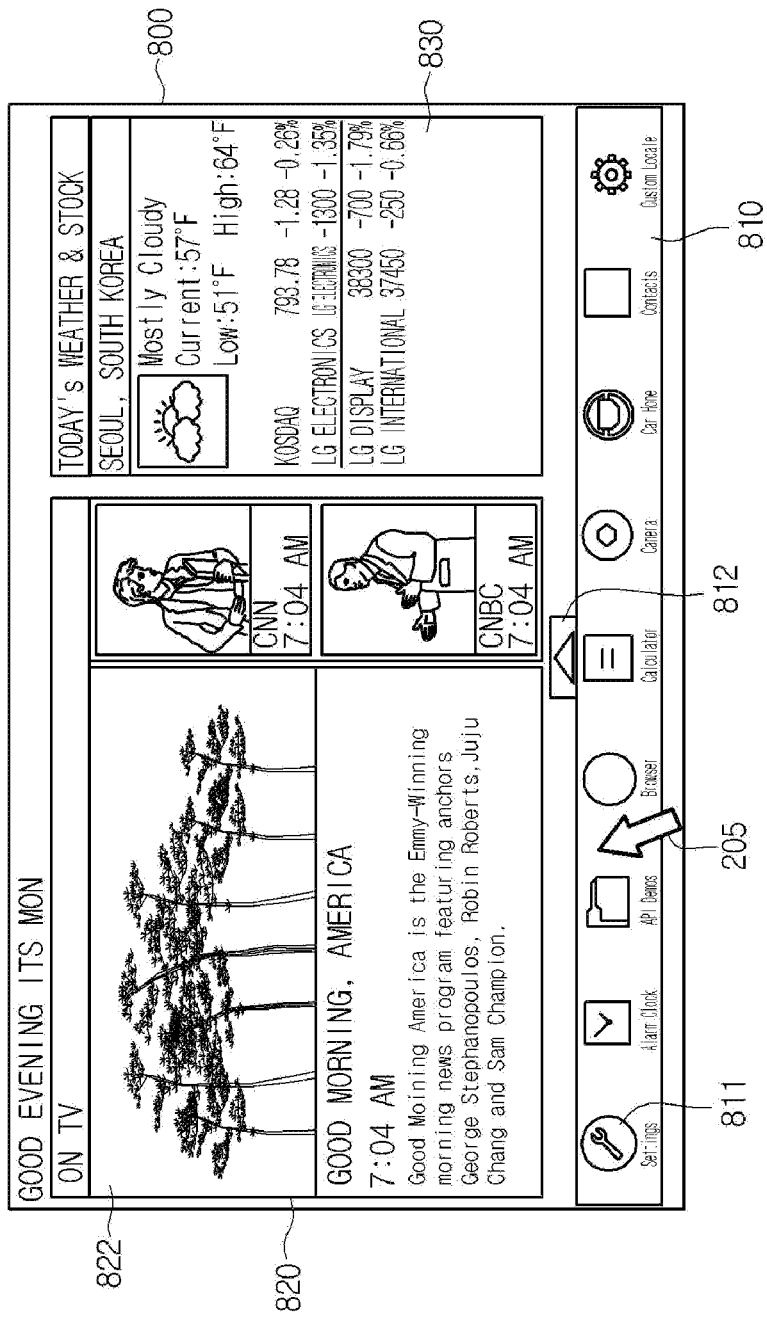
FIGS. 11 to 17 are views illustrating a method of displaying a plurality of objects on a screen of an image display device according to a first embodiment of the present invention.

Referring to FIG. 11, the display 180 may display the application menu 810, i.e., an object representing application items installed in the image display device 100, on the screen 800, and the application menu 810 may be displayed in the first area 900 at the bottom of the screen 800.

For example, the application menu 810 may include icons 811 respectively corresponding to a plurality of applications downloaded using the "APP STORE" object 630 of FIG. 9 and executable in the image display device 100.

Moreover, the application menu 810 may be an application simple view menu, and in this case, some of the plurality of applications executable in the image display device 100 may be displayed in the application menu 810.

Additionally, application items displayed in the application menu 810 may be edited to display frequently used applications by a user's setting.

According to an embodiment of the present invention, the display 180 may display the application menu 810 on the screen 800 in addition to at least one object representing at least one of a broadcast image, a CP list, a purchasable application list, a broadcast channel list, a broadcast guide list, a broadcast reservation/recording list, a media list, an external device list, a call related list, and a list of contents provided from a specific CP.

For example, the display 180 may display a broadcast image display window 820, i.e., an object displaying a broadcast image, in addition to the application menu 810, and the broadcast image display window 82 may include the broadcast image 822 received through the tuner 110 or the network interface 135.

Moreover, the display 180 may display various objects on the screen 800 in addition to the application menu 810 and the broadcast image display window 820. For example, as shown in FIG. 11, the display 180 may display a weather and stock information display window 830, i.e., an object representing today's weather and stock, as shown in FIG. 11.

According to an embodiment of the present invention, the first object displayed on the screen in operation S700 may be the application menu 810 shown in FIG. 11, and the second object may be the weather and stock information display window 830 shown in FIG. 11.

Furthermore, a zoom in button 812 may be displayed inside the application menu 810 or adjacent thereto so as to enlarge the application menu 810.

As described with reference to FIG. 7, a user moves the pointer 205 displayed on the screen 800 by using the remote controller 200 and selects the zoom in button 812 of the application menu 810 so as to make a request for enlargement display on the application menu 810, i.e., the first object.

Figure 12:
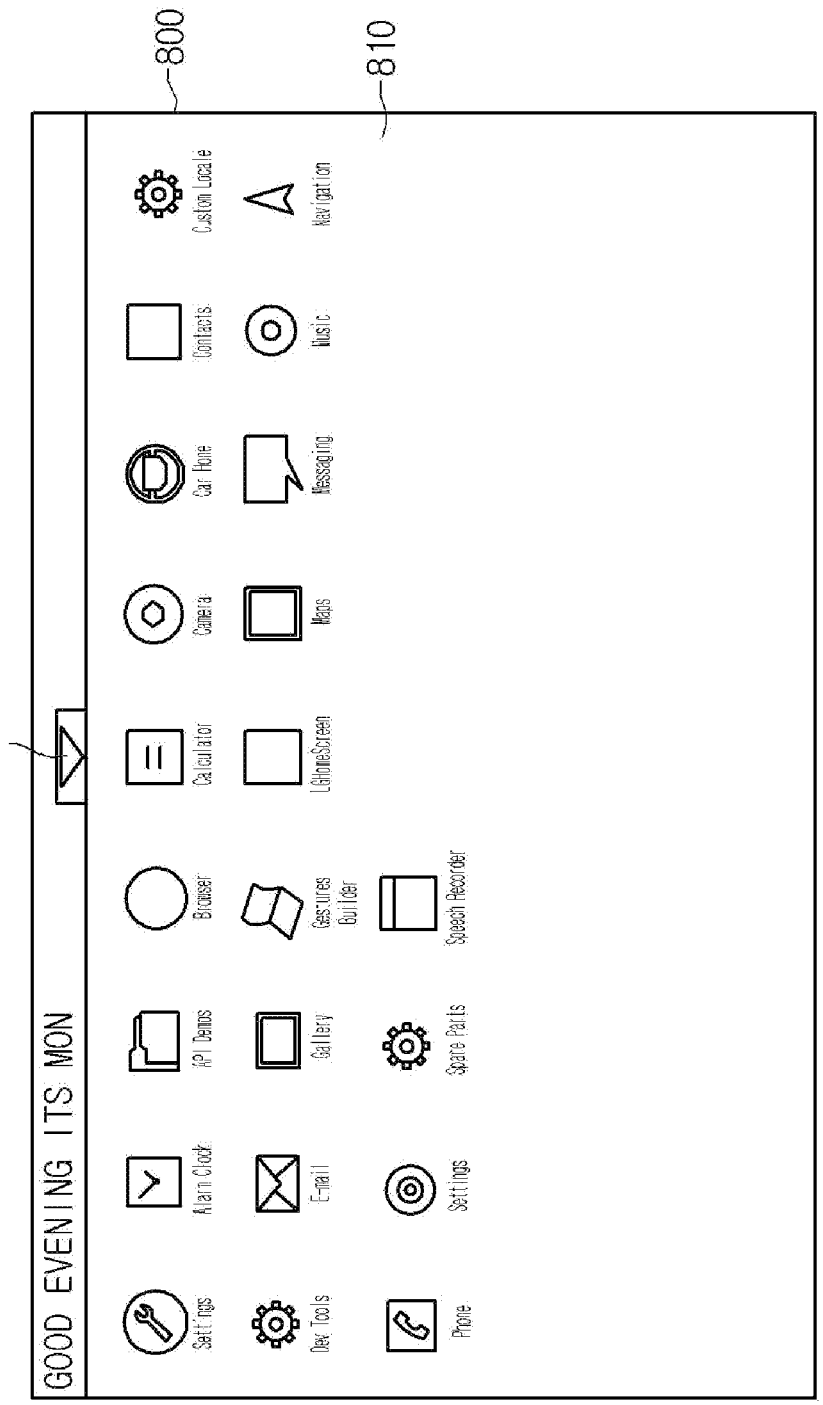

Referring to FIG. 12, when a user selects the zoom in button 812 of the application menu 810, the number of application items in the application menu 810 may be increased.

For example, as the application menu 810 is enlarged and displayed in full screen, icons respectively corresponding to entire applications installed in the image display device 100 may be all displayed on the screen 800.

In this case, as shown in FIG. 12, other objects displayed on the screen 800, for example, the broadcast image display window 820 and the weather and stock display window 830 shown in FIG. 11, may be hidden by the enlarged application menu 810.

Therefore, a user may not confirm previously-displayed other objects and in order to use the objects again, selects the zoom out button 813 of the application menu 810 to reduce the application menu 810 as shown in FIG. 11, and then, selects a corresponding object again.

The control unit 170 confirms whether the first object is dragged in operation S710, and if the first object is dragged toward the second object, the display 180 displays the second area including the second object as the drop position of the first object in operation S720.

Figure 13:
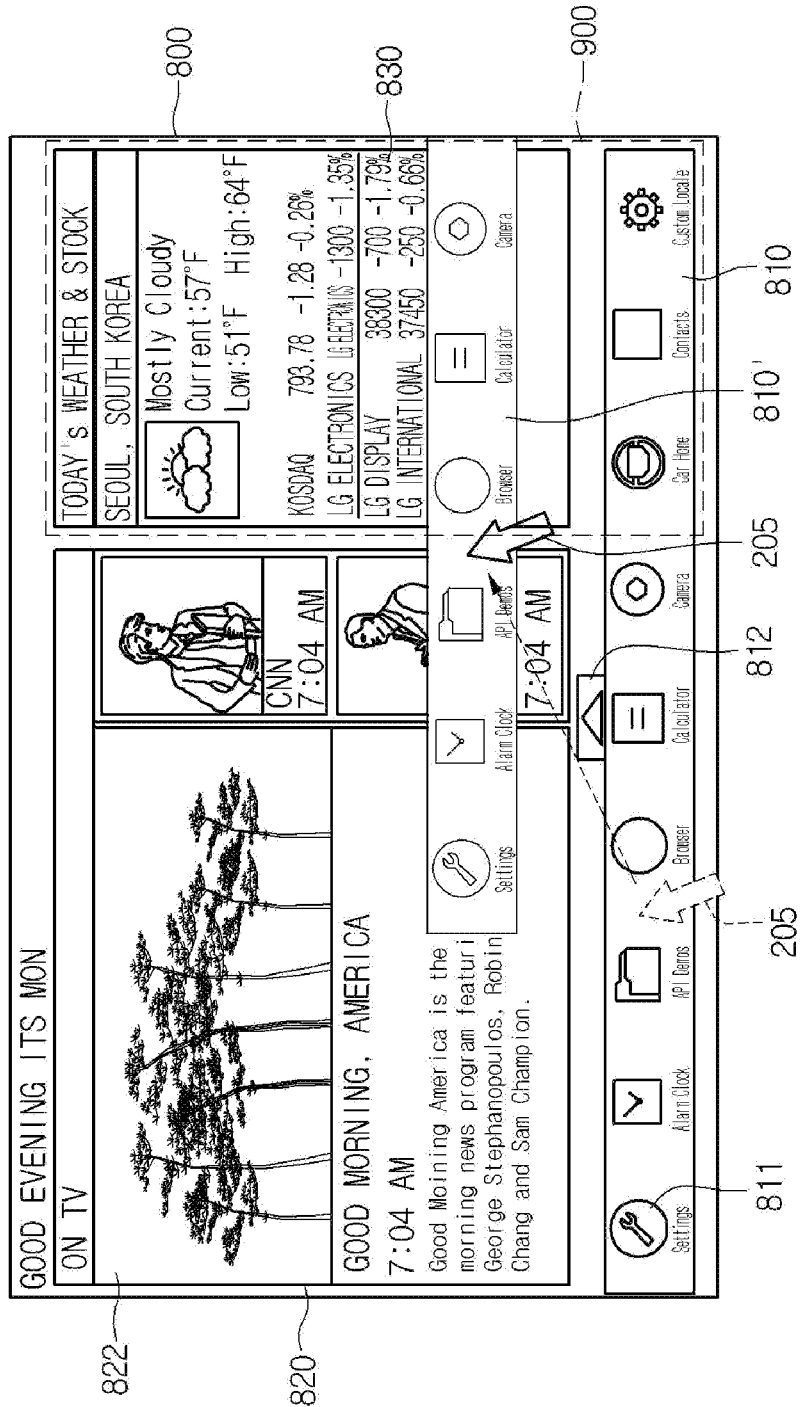

Referring to FIG. 13, a user positions the pointer 205 by using the remote controller 200 to select the application menu 810, i.e., the first object, and while the application menu 810 is selected, moves the pointer 205 to drag the application menu 810 in a specific direction.

In addition, when the application menu 810 is dragged toward the weather and stock information display window 830, i.e., the second object, the display 180 may display the second area 910 including the weather and stock information display window 830 as the drop position of the application menu 810.

For example, as the application menu 810 is dragged, a virtual image 810' corresponding to the application menu 810 is semi-transparently moved and displayed, the second area 910 including the weather and stock information display window 830 in the drag direction may be simultaneously displayed on the screen 800.

In more detail, when the application menu 810 is dragged by a user, the control unit 170 may detect the drag direction, and confirms which object is in the detected drag direction.

Moreover, the control unit 170 may determine the second area 910 to include an object in the drag direction, and the display 180 may display the determined second area 910 on the screen 800.

Furthermore, the control unit 170 may determine the second area 910 not to overlap another third object when determining the second area 910.

For example, the control unit 170 detects the third area 920 having the broadcast image display window 820 displayed therein and determines the second area 910 not to overlap the detected third area 920.

As the second area 910 is displayed on the screen 800, when a user drops the application menu 810 at this point, an area (i.e., an area corresponding to the second area 910) where the application menu 810 is moved and displayed may be confirmed.

Then, the control unit 170 confirms whether the first object is dropped in the second area in operation S730, and if the first object is dropped in the second area, the display 180 moves the first object in the second area and displays it in operation S740.

Figure 14:
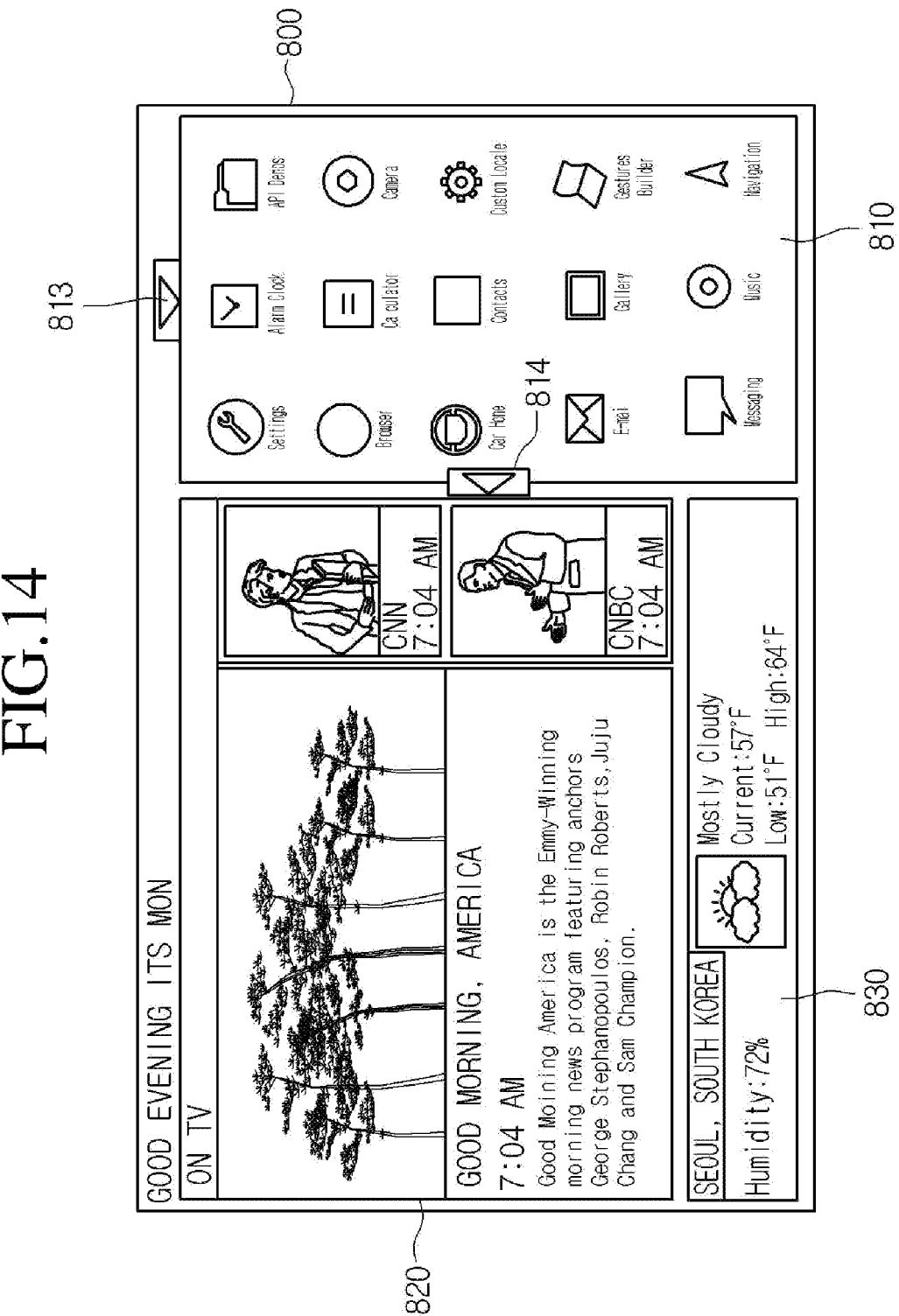

For example, while the second area 910 is displayed on the screen 800, as the application menu 810 dragged by a user is dropped, as shown in FIG. 14, the application menu 810 is moved to the second area 910 and then enlarged and displayed.

For this, the control unit 170 may adjust the size and position of the application menu 810 displayed to correspond to the size and position of the second area 910.

Furthermore, as mentioned above, since the second area 910 is determined not to overlap the broadcast image display window 820, i.e., the third object, the application menu 810 moved to the second area 920 may be displayed with the size that does not hide the broadcast image display window 820.

As mentioned above, as the application menu 810 moved and displayed at a user request does not hide the previously-displayed broadcast image display window 820, a user may continuously use a previously executed object after the application menu 810 is moved.

Furthermore, when a user selects the zoom in button 814 of the application menu 810, the application menu 810 may be displayed as shown in FIG. 12.

When a user selects the zoom out button 813 of the application menu 810, the application menu 810 may be reduced as shown in FIG. 11.

In addition, when a user moves the application menu 810 through a drag and drop operation, as shown in FIG. 14, the weather and stock information display window 830, the second object, is reduced and displayed in the remaining area of the screen 800 where the application menu 810 and the broadcast image display window 820 are not displayed.

In this case, some of the previously displayed weather and stock related information may be displayed on the reduced weather and stock information display window 830.

According to an embodiment of the present invention, when the first object is moved and displayed in the second area, information to be displayed in the left bottom area of the screen 800 where the application menu 810 and the broadcast image display window 820 are not displayed may be selected by a user.

Figure 15:
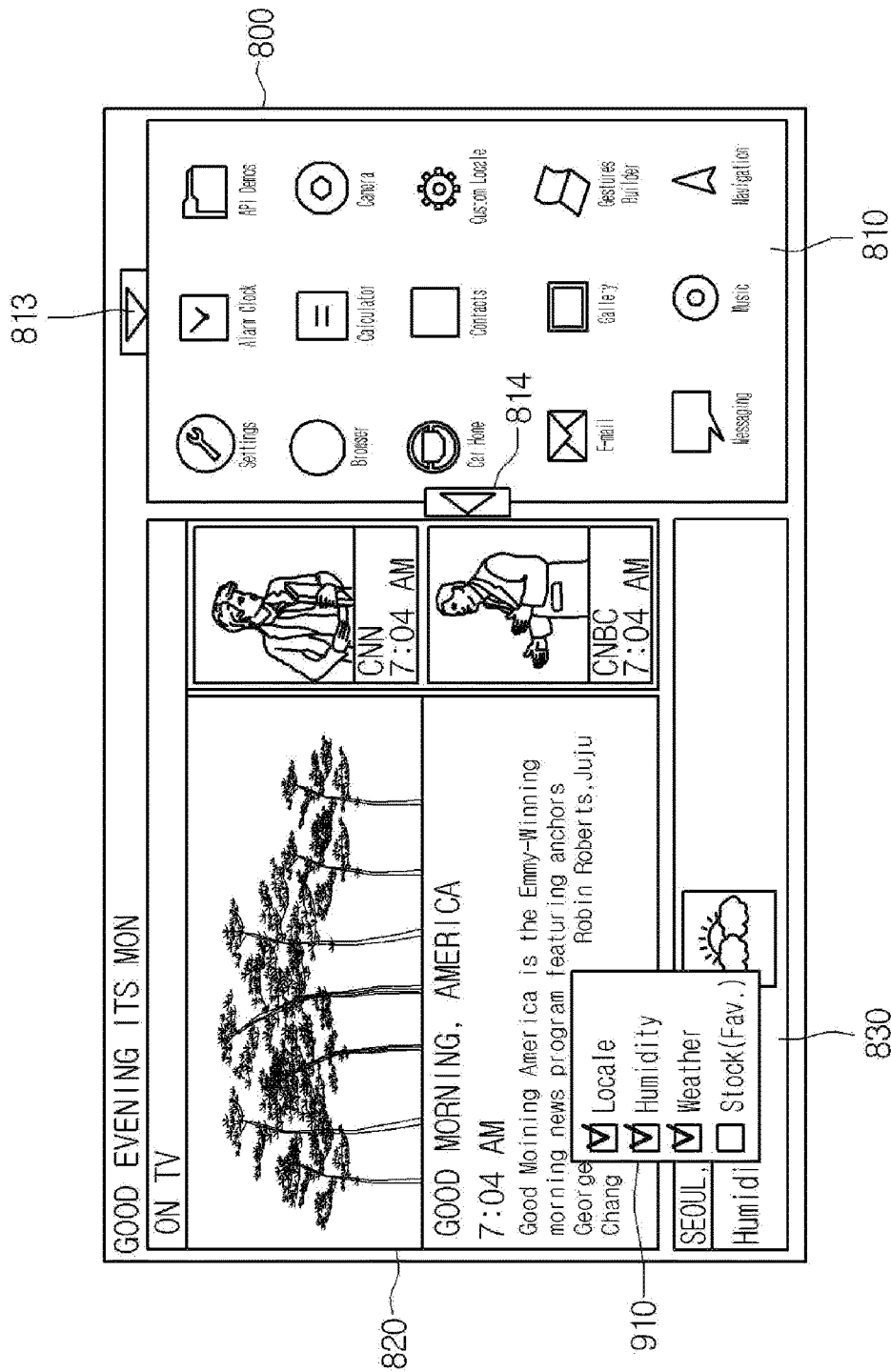

Referring to FIG. 15, as the application menu 810 is moved and displayed in the second area 910, a setting window 930 may be displayed to allow a user to select information to be displayed in the left bottom area of the screen 800.

A user selects at least one of display items, for example, Locale, Humidity, Weather, and Stock, in the setting window 930 so as to display the selected items in the remaining left bottom area in the screen 800.

As shown in FIG. 15, when a user selects Locale, Humidity, Weather, or Stock displayed in the setting window 930 through the pointer 205, the weather and stock information display window 830 including information on each selected item may be displayed in the left bottom area of the screen 800.

Moreover, when a user selects stock information Stock (Fav.) displayed in the setting window 930, information on stocks that a user presets may be included in the weather and stock information display window 830 displayed at the left bottom of the screen 800.

According to another embodiment of the present invention, the second area 910 may be determined to overlap some areas of the third object.

Figure 16:
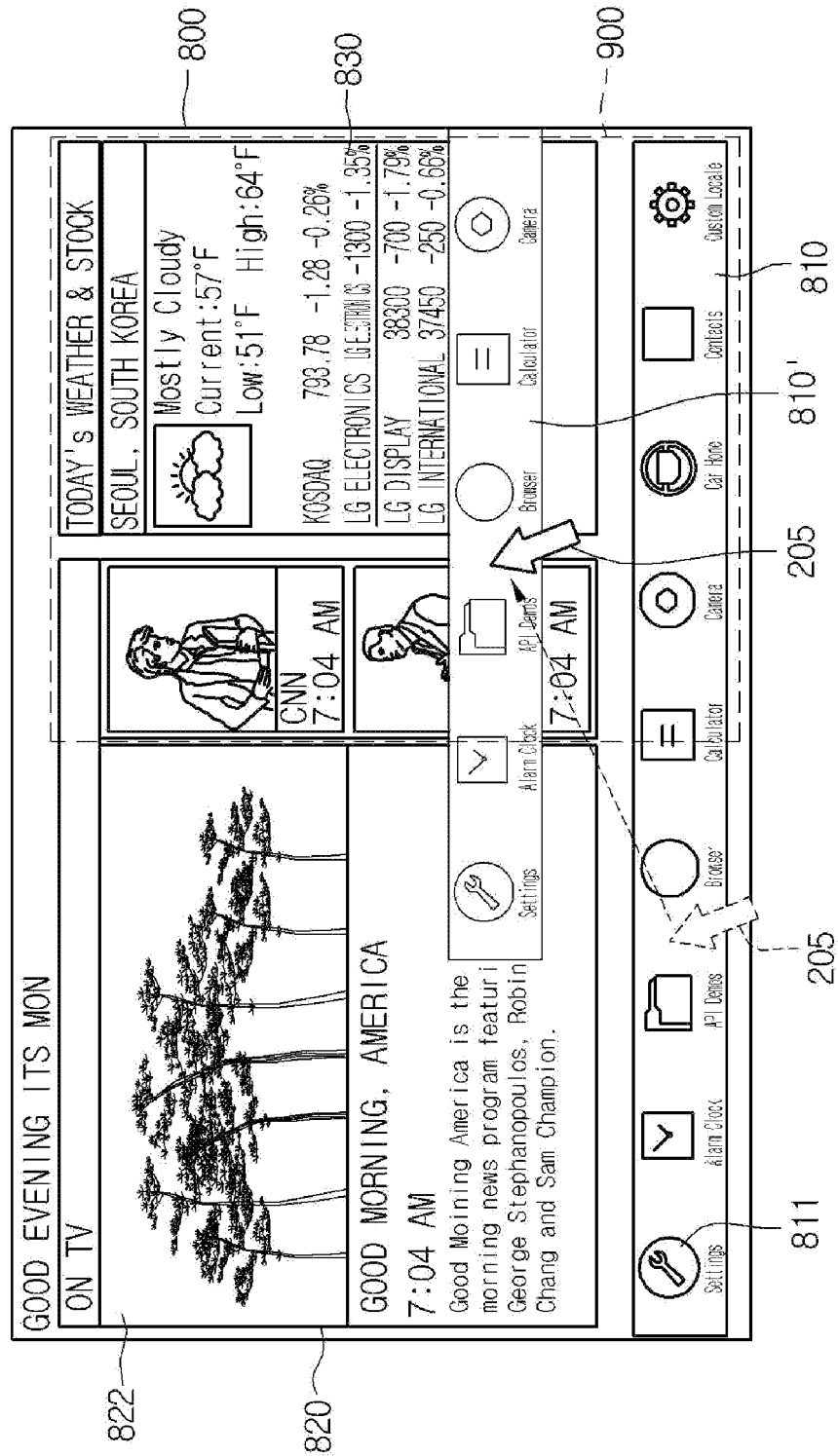

Referring to FIG. 16, as a user drags the application menu 810 toward the weather and stock information display window 830, the second area 910 overlapping the right some areas of the broadcast image display window 820 may be displayed on the screen 800.

In this case, the control unit 170 determines the second area 910 not to overlap the broadcast image 822 in the broadcast image display window 820.

Figure 17:
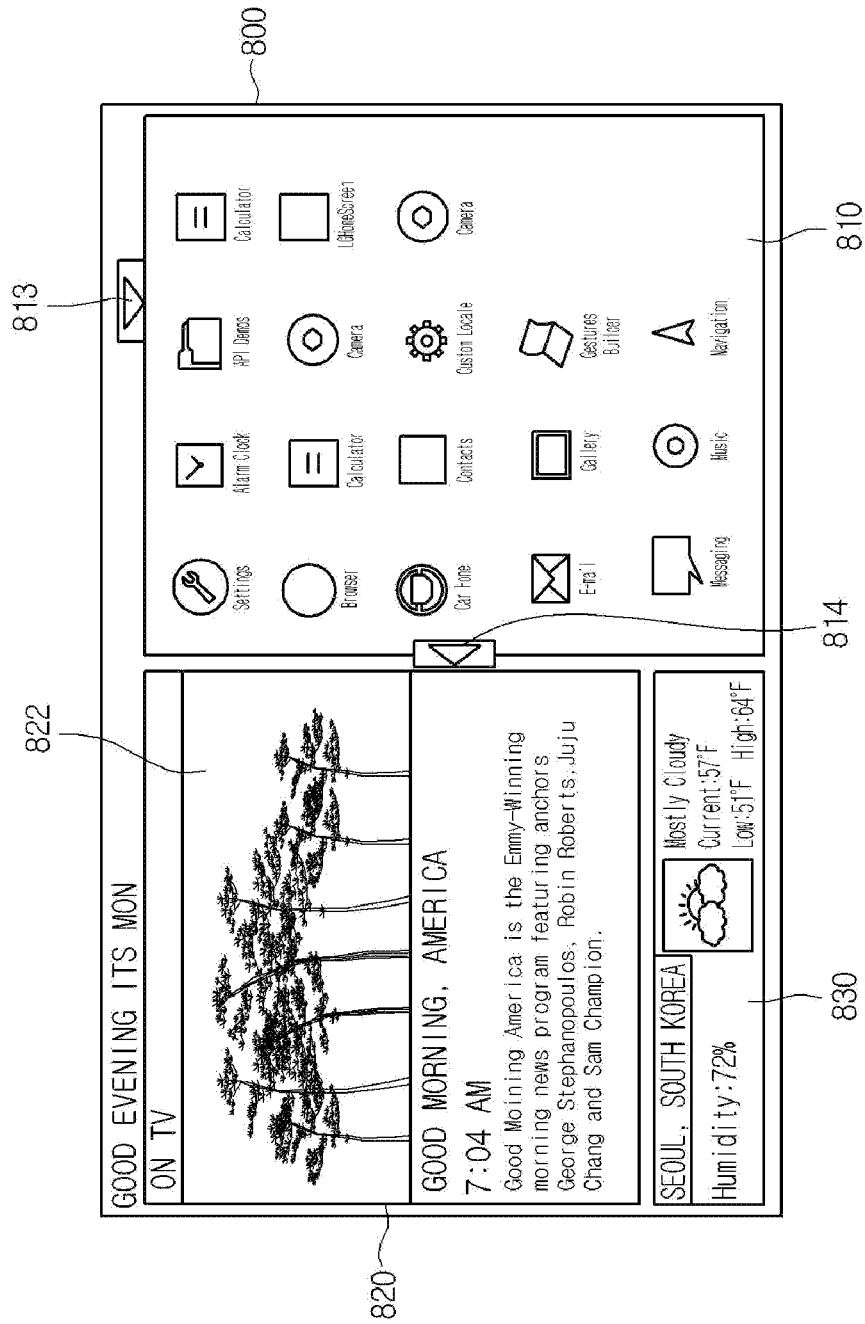

Referring to FIG. 17, as a user drops the dragged application menu 810 in the second area 910 as shown in FIG. 16, the application menu 810 may be more enlarged than that of FIG. 14, and then displayed.

In this case, the moved application menu 810 may be displayed not to hide the broadcast image 822 in the broadcast image display window 820, and accordingly, a user may continuously watch the viewed broadcast image 822.

Figure 18:
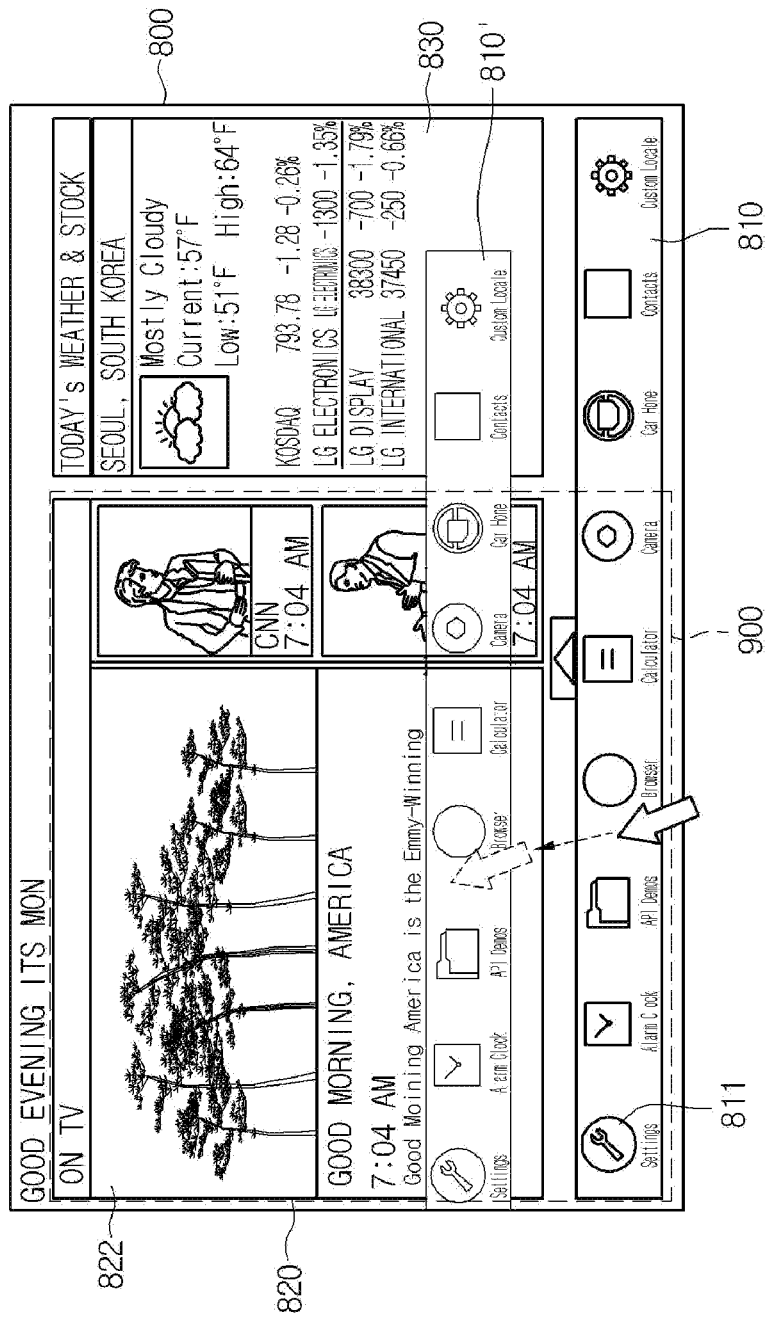
FIGS. 18 to 19 are views illustrating a method of displaying a plurality of objects on a screen of an image display device according to a second embodiment of the present invention.

Referring to FIG. 18, as a user drags the application menu 810 toward the broadcast image display window 820, the second area 910 including the broadcast image display window 820 may be displayed on the screen 800.

In this case, the second area 910 may be displayed on the screen 800 with the size and position that does not overlap the weather and stock information display window 830.

Figure 19:
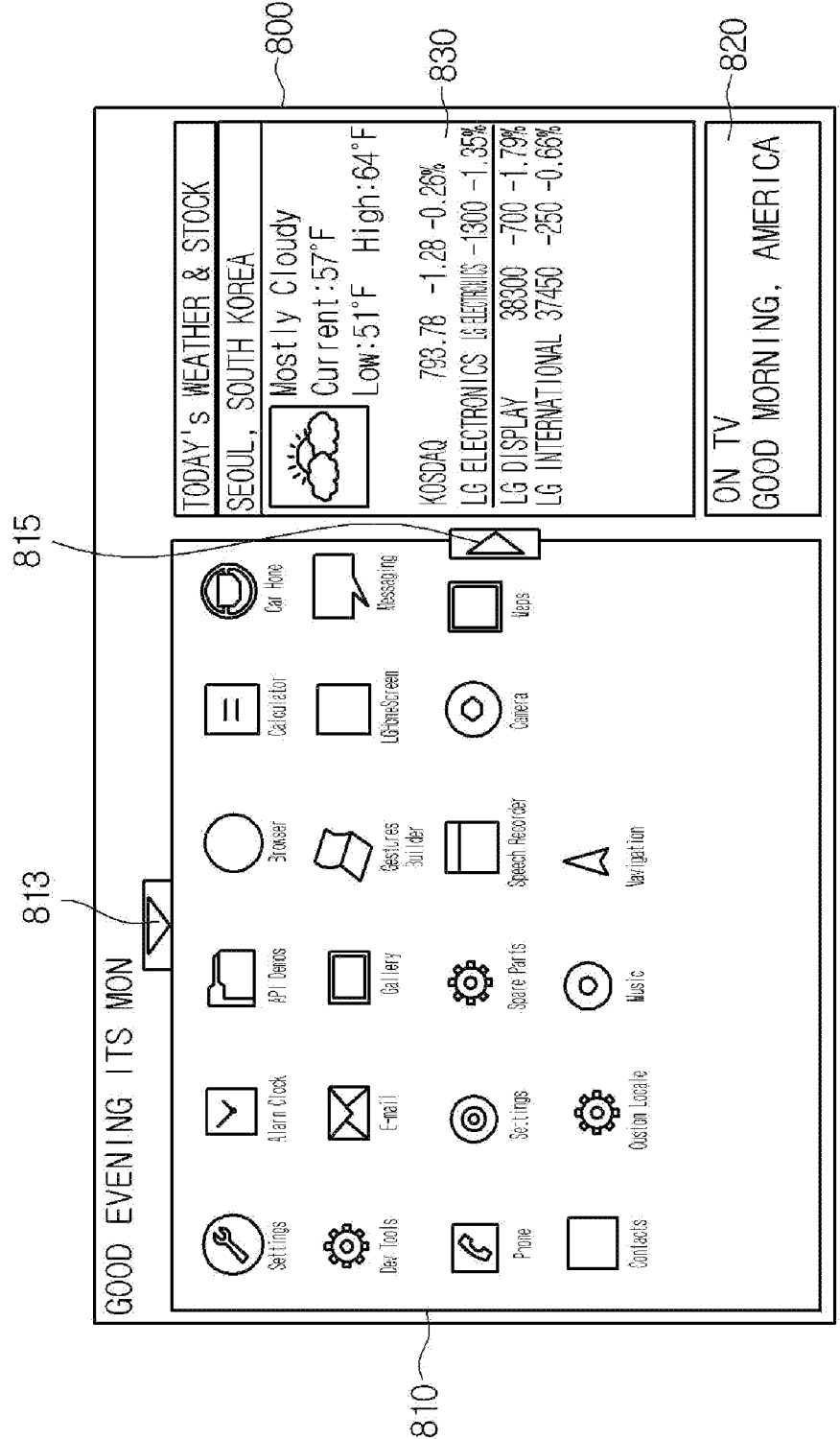

Referring to FIG. 19, as a user drops the dragged application menu 810 in the second area 910 as shown in FIG. 18, the application menu 810 may be moved and displayed in the second area 910 where the broadcast image display window 820 is displayed.

Moreover, the broadcast image display window 820 may be displayed in the right bottom area of the screen 800. For example, the broadcast image display window 820 displayed in the right bottom area may include brief information on a broadcast currently being watched.

Hereinafter, a method of displaying a plurality of objects on a screen of an image display device according to another embodiment of the present invention will be described with reference to FIGS. 20 to 26.

Figure 20:
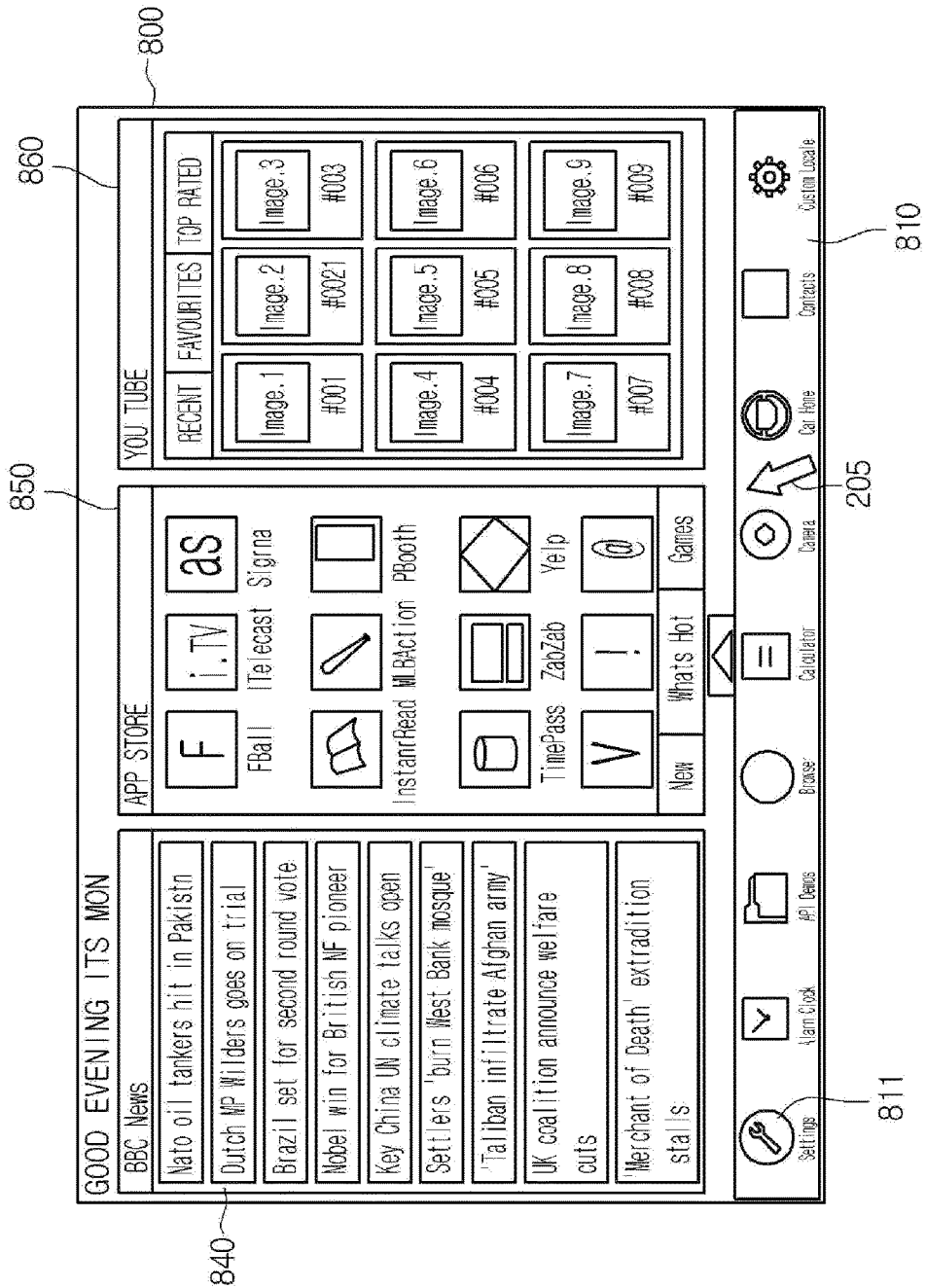
FIGS. 20 to 24 are views illustrating a method of displaying a plurality of objects on a screen of an image display device according to a third embodiment of the present invention.

Referring to FIG. 20, the display 180 may display the application menu 810 and a plurality of objects, for example, a "BBC News" 840 including a news related contents list, an "APP STORE" 850 including a list of applications provided, and a "YOU TUBE" 860 including a video contents list, on the screen 800.

Figure 21:
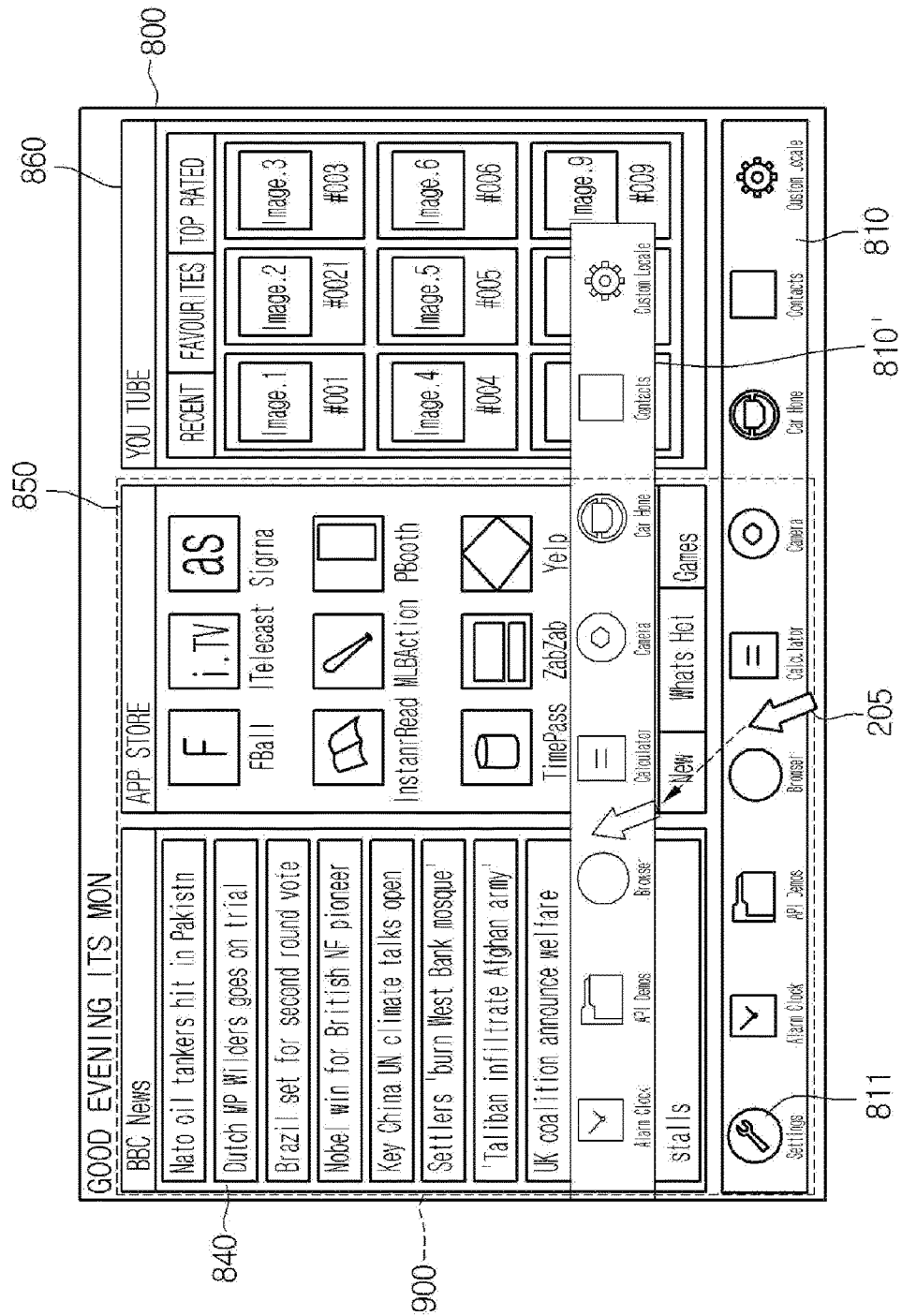

Referring to FIG. 21, as a user drags the application menu 810 toward the "BBC News" 840 and the "APP STORE" 850, the second area 910 including the "BBC News" 840 and the "APP STORE" 850 may be displayed on the screen 800.

In this case, the second area 910 may be displayed on the screen 800 with the size and position that does not overlap the "YOU TUBE" 860.

Figure 22:
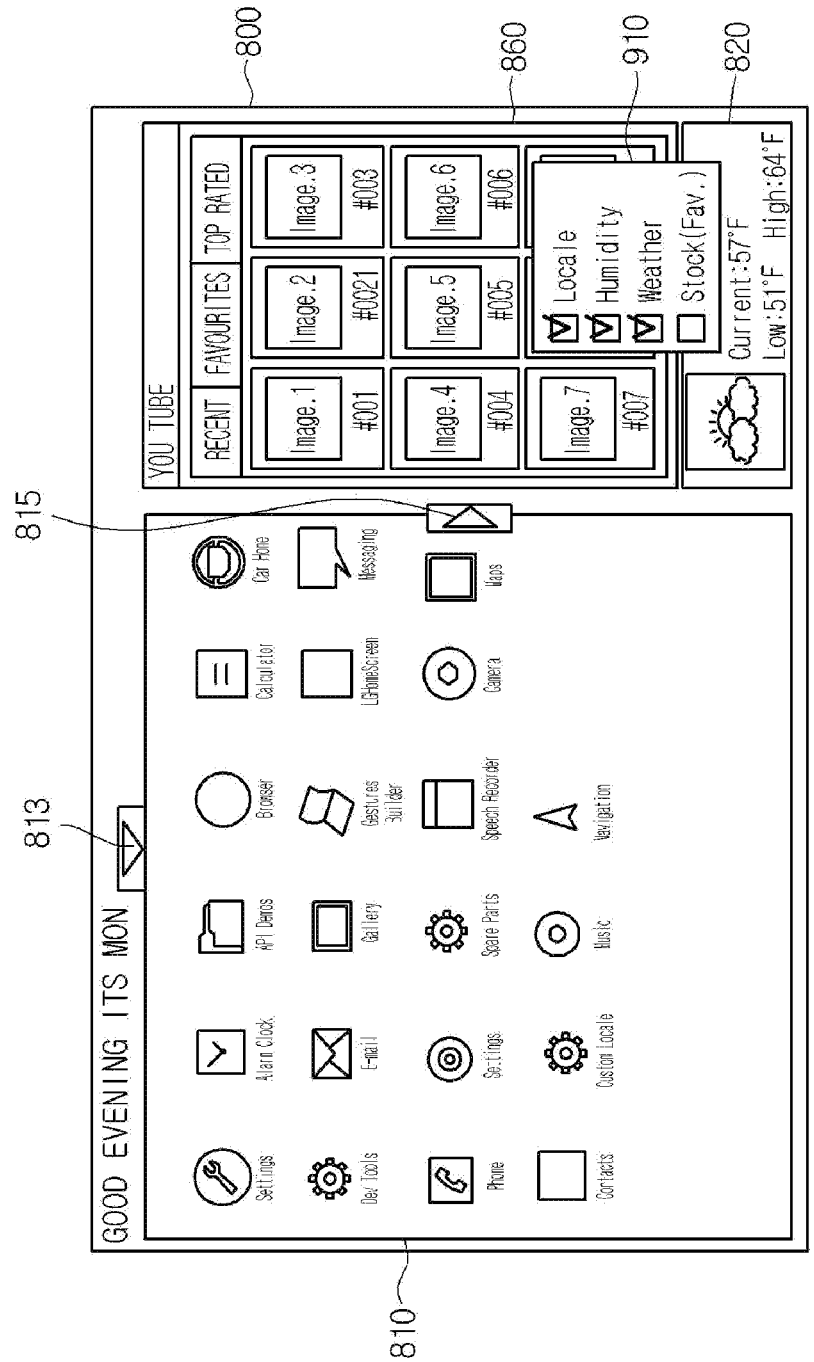

Referring to FIG. 22, as a user drops the dragged application menu 810 in the second area 910, the application menu 810 may be moved and displayed in the second area 910 where the "BBC News" 840 and the "APP STORE" 850 are displayed.

Furthermore, the setting window 930 may be displayed at the right bottom area in the screen 800 where the application menu 810 and the "YOU TUBE" 860 are not displayed, and a user may select at least one item to be displayed in the right bottom area among items displayed in the setting window 930.

Figure 23:
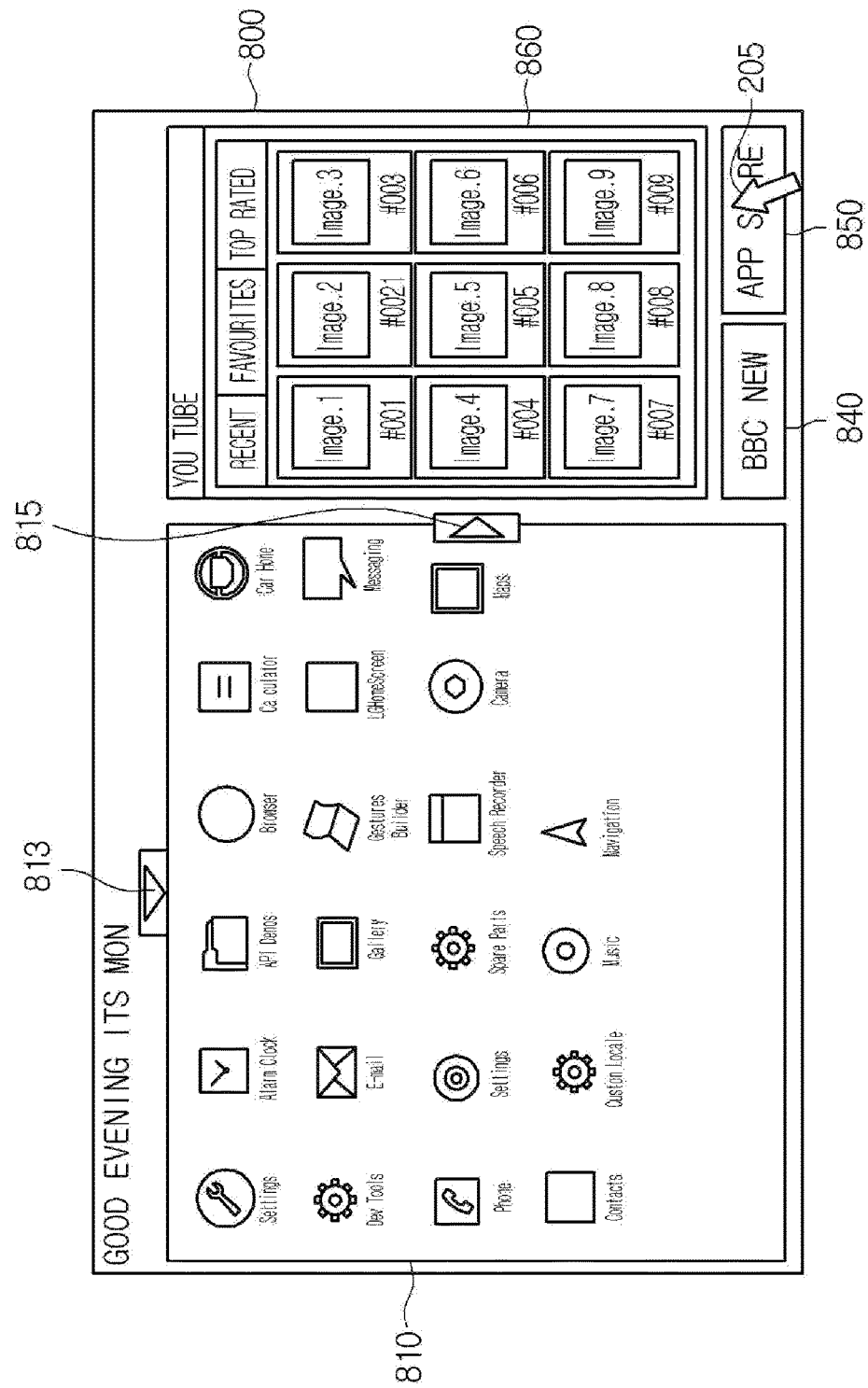

Additionally, as shown in FIG. 23, the remaining objects, i.e., the "BBC News" 840 and the "APP STORE" 850, may be displayed in the right bottom area of the screen 800.

A user may select the "BBC News" 840 or the "APP STORE" 850 shown in FIG. 23, so as to enlarge and display corresponding object on the screen 800.

Figure 24:
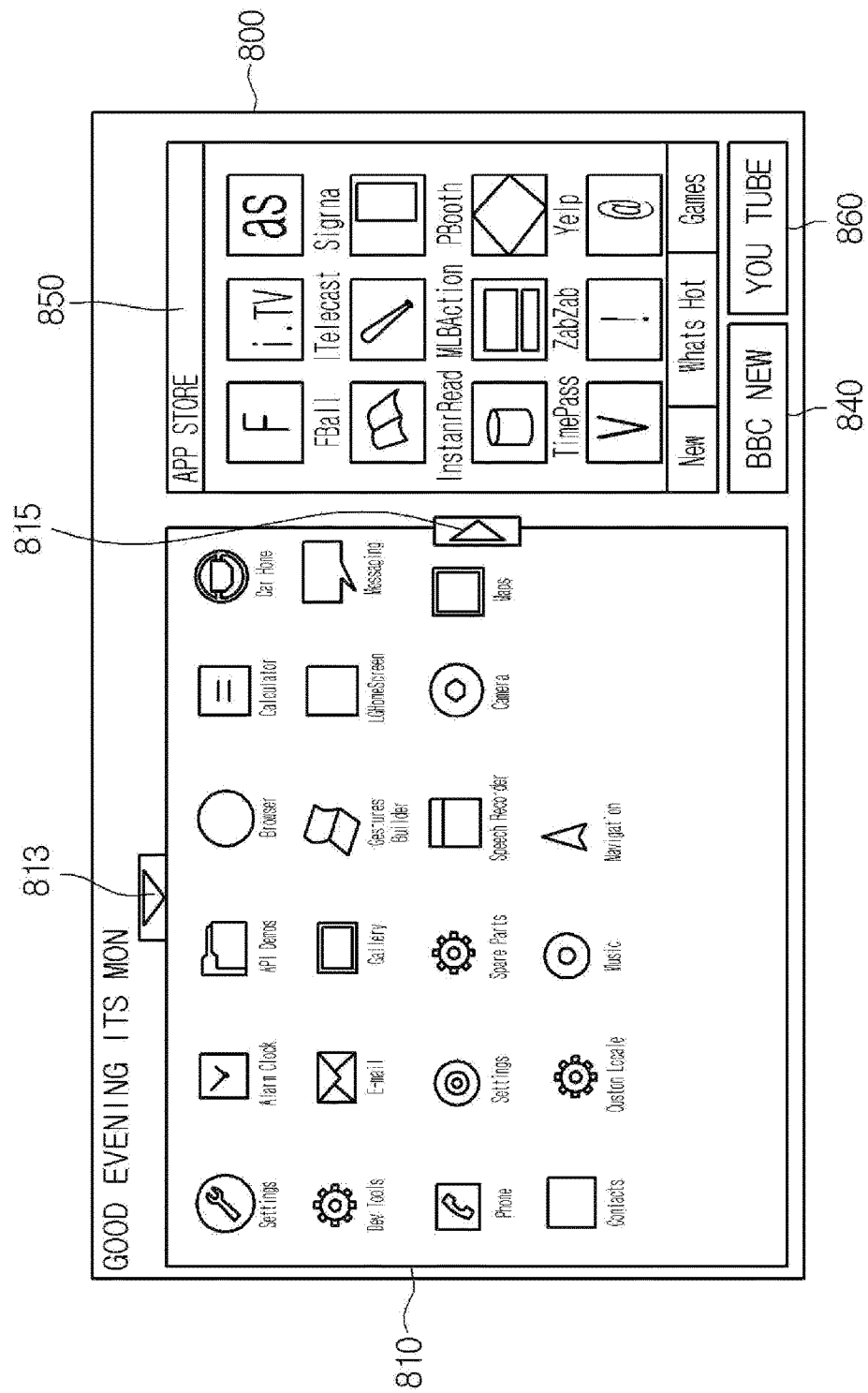

Referring to FIG. 24, when a user selects the "APP STORE" 850 on the screen 800 shown in FIG. 23, the selected "APP STORE" 850 may be displayed at the position where the "YOU TUBE" 860 is displayed previously. The object of the "YOU TUBE" 860 may be moved in the right bottom area of the screen 800 and then, reduced and displayed.

According to another embodiment of the present invention, as the direction that the first object is dragged is changed, the size or position of the second area 910 displayed on the screen 800 may be changed.

Figure 25:
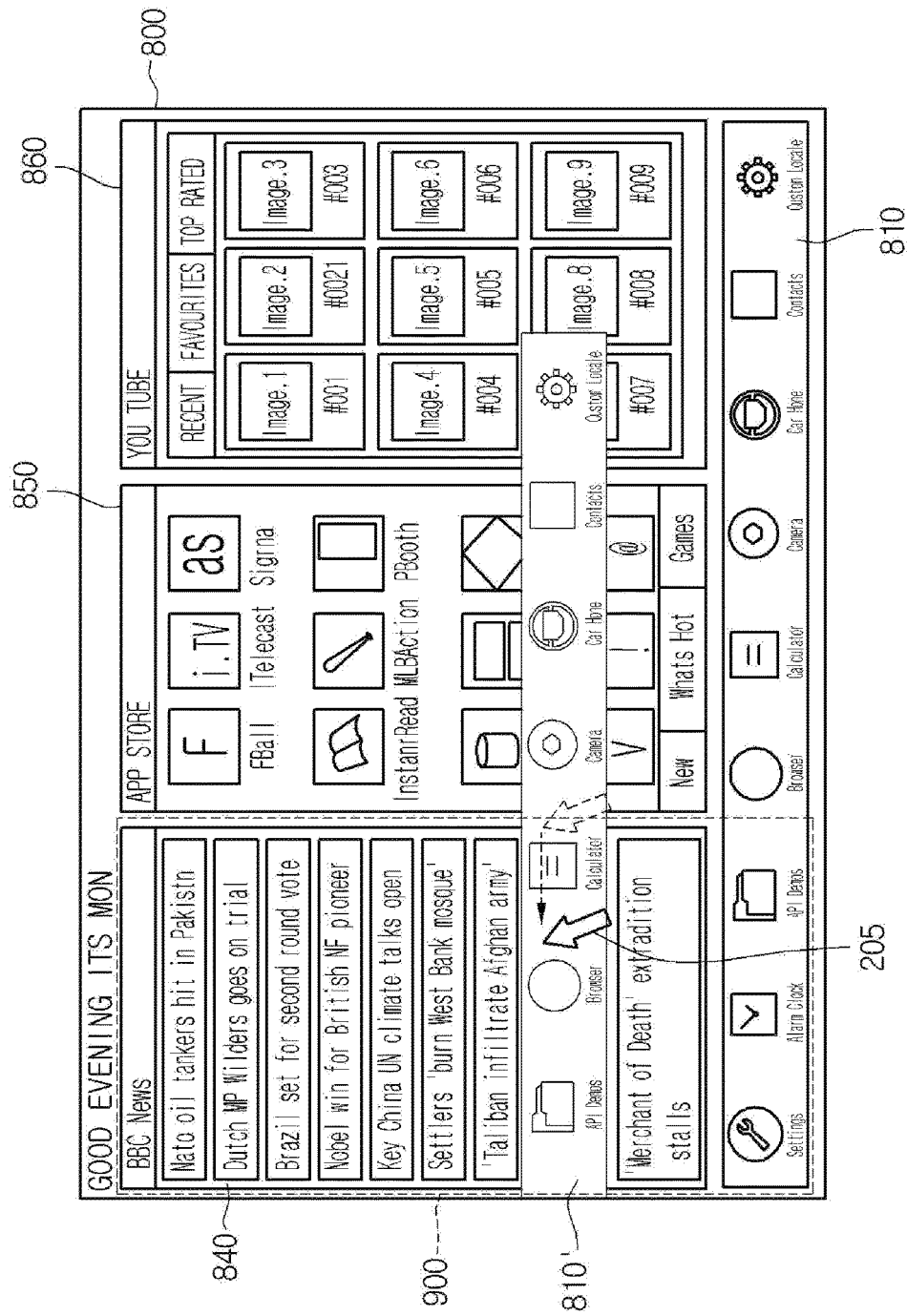
FIGS. 25 and 26 are views illustrating a method of displaying a plurality of objects on a screen of an image display device according to a fourth embodiment of the present invention.

Referring to FIG. 25, as a user drags the application menu 810 further toward the left direction in the screen 800 shown in FIG. 21, the second area 910 including the "BBC News" 840 and the "APP STORE" 850 may be reduced and displayed to include only the "BBC NEWS" 840.

Figure 26:
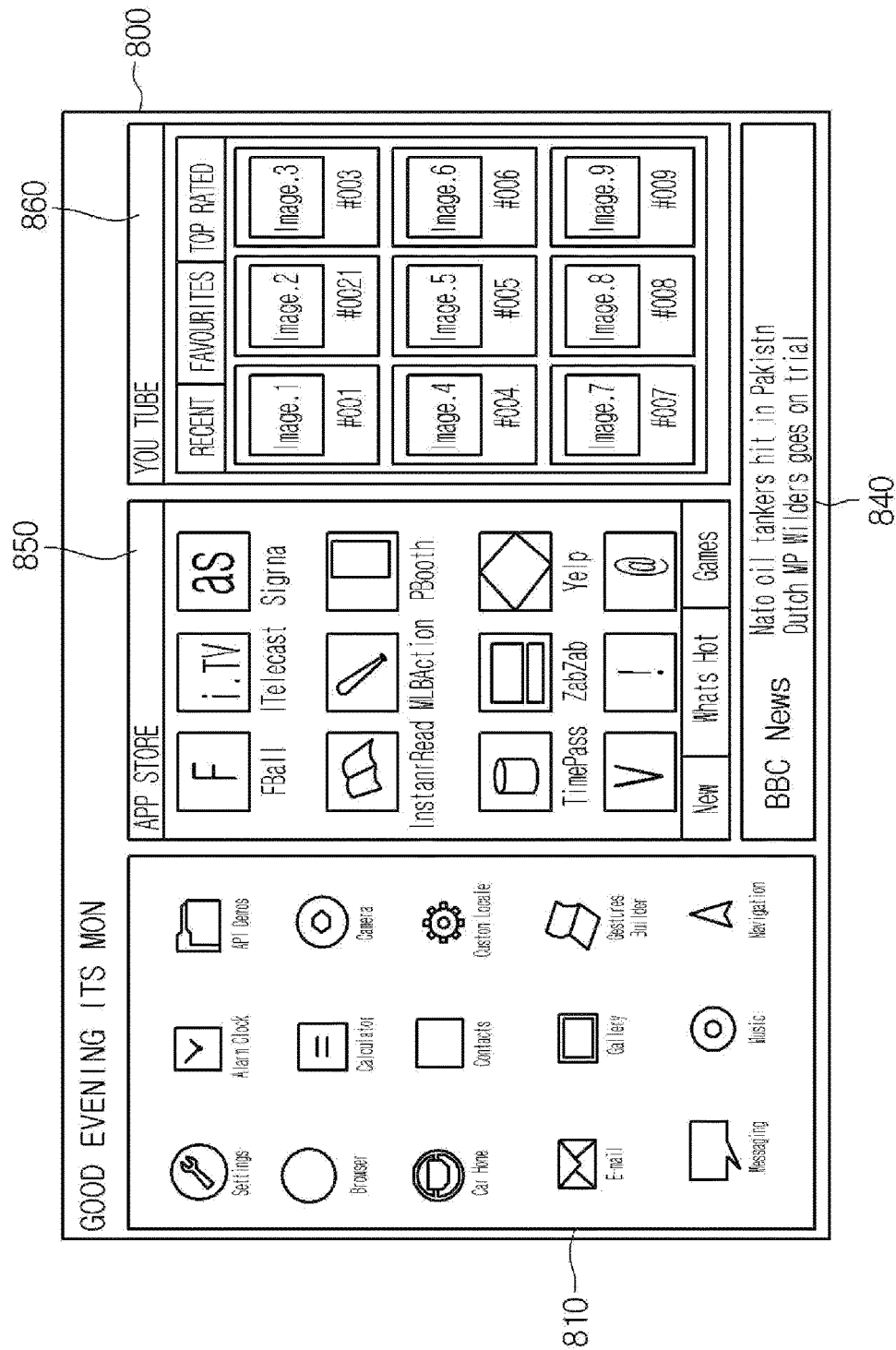

Then, when a user drops the application menu 810 in the second area 910 including the "BBC NEWS" 840, as shown in FIG. 26, the application menu 810 is moved and displayed in the second area 910 where the "BBC NEWS" 840 is displayed.

In this case, the application menu 810 moved in the second area 910 is displayed without hiding the "APP STORE" 850 and the "YOU TUBE" 860, and the "BBC News" 840 is moved to the right bottom area of the screen 800, and then reduced and displayed.

Moreover, the reduced "BBC News" 840 may include part of previously displayed news contents.

According to an embodiment of the present invention, the display position of an object representing an application item is changed using a drag and drop operation, so that user's convenience may be improved.

Furthermore, the display position and size of the object is adjusted not to hide another object, so that a plurality of objects displayed on a screen of an image display device may be easily confirmed and selected.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a display of an image display device, the method comprising:
　　displaying, via the display, a first object, a second object, and a third object on a screen;
　　as the first object displayed in a first area is dragged toward the second object, displaying, via a control unit, a second area including the second object as a drop position of the first object before the first object is dropped in the second area, in order to confirm the second area where the first object is to be moved and displayed;
　　as the first object is dropped in the second area, moving, via the control unit, the first object from the first area to the second area and displaying the moved first object in the second area;
　　displaying, via the control unit, a setting window including a plurality of display items;
　　receiving, via the control unit, a user input for selecting at least one of the display items in the setting window to be displayed in the first area; and
　　displaying, via the control unit, an object including the selected display items in the first area, wherein the first object comprises at least an application item among a plurality of application items installed in the image display device, the at least the application item displayed in the first area is set to display frequently used applications, wherein the second area does not overlap a third area where the third object is displayed, and wherein as a display position of the first object is moved, the number of application items in the first object is increased.

2. The method according to claim 1, wherein the second object comprises at least one of a content provider list, a purchasable application list, a broadcast channel list, a broadcast guide list, a broadcast reservation/recording list, a media list, an external device list, a call related list and a content list provided from a specific content provider.

3. The method according to claim 1 wherein a size and position of a third area where the third object is displayed are maintained regardless of a movement of the first object.

4. The method according to claim 1, wherein the first object moved to the second area is displayed not to hide the third object displayed on the screen.

5. The method according to claim 4, wherein the displaying of the drop position comprises:
    detecting the third area where the third object is displayed; and
    determining the second area not to overlap the detected third area.

6. The method according to claim 1, further comprising, when the first object is displayed in the second area, displaying at least a portion of the second object in the first area.

7. The method according to claim 6, further comprising receiving a user input for selecting the portion of the second object to be displayed in the first area.

8. A non-transitory computer readable recording medium having a program recorded thereon to execute the method of claim 1 by a computer.

9. An image display device comprising:
    a display displaying on a screen a first object including at least an application item in addition to a second object and a third object;
    a user interface receiving a drag and drop operation on the first object displayed in a first area; and
    a control unit,
        when the first object is dragged to a second area, the second area including the second object as a drop position of the first object before the first object is dropped in the second area, in order to confirm the second area where the first object is to be moved and displayed,
        displaying a setting window including a plurality of display items,
        receiving a user input for selecting at least one of the display items in the setting window, and
        displaying an object including selected display items in the first area,
        wherein the at least the application item displayed in the first area is set to display frequently used applications among a plurality of application items installed in the image display device,
    wherein the second area does not overlap a third area where the third object is displayed, and
    wherein as a display position of the first object is moved, the number of application items in the first object is increased.

10. The image display device according to claim 9, wherein as the first object is dragged toward the second object, the display displays the second area to be distinguished from another area of a screen.

11. The image display device according to claim 9, further comprising a tuner receiving a broadcast signal of a channel selected by a user input.

12. The image display device according to claim 11, wherein the display displays the third object for displaying an image of a broadcast signal received through the tuner on one screen in addition to the first and second objects.

13. The image display device according to claim 12, wherein a size and position of the third area are maintained regardless of a movement of the first object.

14. The image display device according to claim 9, wherein the control unit determines the second area in order to allow the moved first object not to overlap the third object displayed on a screen.

* * * * *